US011790081B2

(12) United States Patent
D'Amato et al.

(10) Patent No.: US 11,790,081 B2
(45) Date of Patent: Oct. 17, 2023

(54) SYSTEMS AND METHODS FOR CONTROLLING AN INDUSTRIAL ASSET IN THE PRESENCE OF A CYBER-ATTACK

(71) Applicant: General Electric Company, Schenectady, NY (US)

(72) Inventors: Fernando Javier D'Amato, Niskayuna, NY (US); Mustafa Tekin Dokucu, Latham, NY (US); Hema Kumari Achanta, III, Schenectady, NY (US); Kalpesh Singal, Ballston Spa, NY (US); Masoud Abbaszadeh, Clifton Park, NY (US); Yuh-Shyang Wang, Pittsburgh, PA (US); Karla Kvaternik, Schenectady, NY (US); Souransu Nandi, Niskayuna, NY (US); Georgios Boutselis, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 17/229,934

(22) Filed: Apr. 14, 2021

(65) Prior Publication Data
US 2022/0334540 A1 Oct. 20, 2022

(51) Int. Cl.
*G05B 13/02* (2006.01)
*G06F 21/55* (2013.01)
(Continued)

(52) U.S. Cl.
CPC ............ *G06F 21/554* (2013.01); *G05B 15/02* (2013.01); *G06F 9/45508* (2013.01); *G06N 20/00* (2019.01); *G06F 2221/034* (2013.01)

(58) Field of Classification Search
CPC ............. H04L 63/1408; H04L 63/1416; H04L 63/1433; G06F 21/85; G06F 21/53;
(Continued)

(56) References Cited

U.S. PATENT DOCUMENTS

| 4,455,614 A | 6/1984 | Martz et al. |
| 7,225,343 B1 | 5/2007 | Honig et al. |

(Continued)

FOREIGN PATENT DOCUMENTS

| CN | 112261042 A | 1/2021 |
| EP | 3239884 A1 | 11/2017 |

(Continued)

OTHER PUBLICATIONS

Almalawi et al., An Unsupervised Anomaly-based Detection Approach for Integrity Attacks on SCADA Systems, ScienceDirect, Computers & Security, vol. 46, Oct. 2014, pp. 94-110. (Abstract Only) https://doi.org/10.1016/j.cose.2014.07.005.

(Continued)

*Primary Examiner* — Tuan A Vu
(74) *Attorney, Agent, or Firm* — Dority & Manning, P.A.

(57) ABSTRACT

Systems and methods are provided for the control of an industrial asset, such as a power generating asset. Accordingly, a cyber-attack model predicts a plurality of operational impacts on the industrial asset resulting from a plurality of potential cyber-attacks. The cyber-attack model also predicts a corresponding plurality of potential mitigation responses. In operation, a cyber-attack impacting at least one component of the industrial asset is detected via the cyber-attack neutralization module and a protected operational impact of the cyber-attack is identified based on the cyber-attack model. The cyber-attack neutralization module selects at least one mitigation response of the plurality of mitigation responses based on the predicted operational impact and an operating state of the industrial asset is altered based on the selected mitigation response.

19 Claims, 9 Drawing Sheets

(51) Int. Cl.
*G06N 20/00* (2019.01)
*G05B 15/02* (2006.01)
*G06F 9/455* (2018.01)

(58) Field of Classification Search
CPC .............. G06F 9/45508; G06F 21/554; G06F 2221/034; G06F 21/566; G08G 1/166; G06N 7/005; G06N 20/00; G05B 15/02; G05B 13/02

See application file for complete search history.

(56) References Cited

U.S. PATENT DOCUMENTS

| | | | |
|---|---|---|---|
| 7,818,276 B2 | 10/2010 | Veillette et al. | |
| 8,191,136 B2 | 5/2012 | Dudfield | |
| 8,219,356 B2 | 7/2012 | Mihok et al. | |
| 8,468,244 B2 | 6/2013 | Redlich et al. | |
| 8,756,047 B2 | 6/2014 | Patel | |
| 8,849,737 B1 | 9/2014 | Engler | |
| 8,973,123 B2 | 3/2015 | Chong et al. | |
| 8,973,124 B2 | 3/2015 | Chong et al. | |
| 9,046,886 B2 | 6/2015 | Chong et al. | |
| 9,130,983 B2 | 9/2015 | Heo et al. | |
| 9,245,116 B2 | 1/2016 | Evans et al. | |
| 9,379,951 B2 | 6/2016 | Mihnev | |
| 9,384,885 B2 | 7/2016 | Karalis et al. | |
| 9,397,997 B2 | 7/2016 | Chong et al. | |
| 9,405,900 B2 | 8/2016 | Dixit et al. | |
| 9,483,049 B2 | 11/2016 | Maeda et al. | |
| 9,712,553 B2 | 7/2017 | Nguyen et al. | |
| 9,998,487 B2 | 6/2018 | Mestha et al. | |
| 10,303,954 B2 | 5/2019 | Xiao et al. | |
| 10,387,728 B2 | 8/2019 | Arya et al. | |
| 10,417,415 B2 | 9/2019 | Abbaszadeh et al. | |
| 10,594,712 B2 | 3/2020 | Mestha et al. | |
| 10,678,912 B2 | 6/2020 | Mestha et al. | |
| 10,728,282 B2 | 7/2020 | Mestha et al. | |
| 10,749,890 B1 | 8/2020 | Aloisio et al. | |
| 11,429,713 B1* | 8/2022 | Donovan | G06F 21/53 |
| 2002/0032717 A1 | 3/2002 | Malan et al. | |
| 2006/0010493 A1 | 1/2006 | Piesco et al. | |
| 2007/0289013 A1 | 12/2007 | Lim | |
| 2008/0010225 A1* | 1/2008 | Gonsalves | G06N 7/005 706/11 |
| 2008/0288330 A1 | 11/2008 | Hildebrand et al. | |
| 2011/0020122 A1 | 1/2011 | Parthasarathy et al. | |
| 2011/0272161 A1 | 11/2011 | Kumaran et al. | |
| 2012/0209539 A1 | 8/2012 | Kim | |
| 2013/0104236 A1* | 4/2013 | Ray | H04L 63/1408 726/25 |
| 2013/0132149 A1 | 5/2013 | Wei et al. | |
| 2013/0204664 A1 | 8/2013 | Romagnolo et al. | |
| 2013/0291115 A1 | 10/2013 | Chong et al. | |
| 2013/0318022 A1 | 11/2013 | Yadav et al. | |
| 2014/0103652 A1 | 4/2014 | Ubben et al. | |
| 2014/0107521 A1 | 4/2014 | Galan | |
| 2014/0201780 A1 | 7/2014 | Wong et al. | |
| 2014/0244192 A1 | 8/2014 | Craig et al. | |
| 2014/0283047 A1 | 9/2014 | Dixit et al. | |
| 2014/0297635 A1 | 10/2014 | Orduna et al. | |
| 2014/0298399 A1 | 10/2014 | Heo et al. | |
| 2014/0337973 A1 | 11/2014 | Foster et al. | |
| 2014/0359708 A1 | 12/2014 | Schwartz | |
| 2015/0033341 A1 | 1/2015 | Schmidder et al. | |
| 2015/0095003 A1 | 4/2015 | Horowitz et al. | |
| 2015/0118047 A1 | 4/2015 | Yoon et al. | |
| 2015/0149174 A1 | 5/2015 | Gollan et al. | |
| 2015/0249864 A1 | 9/2015 | Tang et al. | |
| 2015/0346706 A1 | 12/2015 | Gendelman | |
| 2015/0347902 A1 | 12/2015 | Butler, Jr. et al. | |
| 2016/0033941 A1 | 2/2016 | T et al. | |
| 2016/0127931 A1 | 5/2016 | Baxley et al. | |
| 2016/0212100 A1 | 7/2016 | Banerjee | |
| 2016/0222816 A1 | 8/2016 | Chen et al. | |
| 2016/0328654 A1 | 11/2016 | Bauer et al. | |
| 2016/0333855 A1 | 11/2016 | Lund et al. | |
| 2016/0341636 A1 | 11/2016 | Rajaram et al. | |
| 2017/0034205 A1 | 2/2017 | Canedo et al. | |
| 2017/0052960 A1 | 2/2017 | Alizadeh-Shabdiz et al. | |
| 2017/0054751 A1 | 2/2017 | Schneider et al. | |
| 2017/0142133 A1 | 5/2017 | Kallos | |
| 2017/0244726 A1 | 8/2017 | Finkel et al. | |
| 2017/0284896 A1 | 10/2017 | Harpale et al. | |
| 2017/0310690 A1 | 10/2017 | Mestha et al. | |
| 2017/0346840 A1* | 11/2017 | Barkan | G06F 21/566 |
| 2017/0352245 A1 | 12/2017 | Maher et al. | |
| 2018/0115561 A1 | 4/2018 | Sun et al. | |
| 2018/0137277 A1 | 5/2018 | Mestha et al. | |
| 2018/0157831 A1 | 6/2018 | Abbaszadeh et al. | |
| 2018/0268264 A1 | 9/2018 | Marwah et al. | |
| 2018/0276375 A1* | 9/2018 | Arov | G06F 21/85 |
| 2019/0230119 A1* | 7/2019 | Mestha | H04L 63/1416 |
| 2019/0362070 A1 | 11/2019 | Abbaszadeh | |
| 2020/0244677 A1 | 7/2020 | Abbaszadeh et al. | |
| 2021/0081270 A1 | 3/2021 | Abbaszadeh et al. | |
| 2021/0295439 A1* | 9/2021 | Konrardy | G08G 1/166 |
| 2022/0046047 A1* | 2/2022 | Lewis | H04L 63/1433 |

FOREIGN PATENT DOCUMENTS

| | | |
|---|---|---|
| WO | WO2014/144857 A2 | 9/2014 |
| WO | WO2015/092817 A1 | 6/2015 |
| WO | WO2016/020660 A1 | 2/2016 |
| WO | WO2016/139097 A1 | 9/2016 |
| WO | WO2016/172514 A1 | 10/2016 |
| WO | WO2016/176682 A1 | 11/2016 |

OTHER PUBLICATIONS

Datta et al, Cyber Threat Analysis Framework for the Wind Energy Based Power System, CPS '17: Proceedings of the 2017 Workshop on Cyber-Physical Systems Security and Privacy, Nov. 2017, pp. 81-92. https://doi.org/10.1145/31402413.3140247.

Gao et al., On Cyber Attacks and Signature Based Intrusion Detection for Modbus Based Industrial Control Systems, Journal of Digital Forensics, Security and Law, vol. 9, No. 1, 2014, 20 Pages.

Jiang et al., Wind Turbine Fault Detection Using a Denoising Autoencoder with Temporal Information, IEEE, Journals & Magazines, IEEE/ASME Transactions on Mechatronics, vol. 23, Issue 1, Feb. 2018, pp. 89-100. (Abstract Only) https://doi.org/.10.1109/TMECH.2017.2759301.

Karimipour et al., Relaxation-based Anomaly Detection in Cyber-Physical Systems Using Ensemble KalmanFilter, ResearchGate, IET Cyber-Physical Systems Theory & Applications, vol. 5, Issue 1, 2020, p. 49-58. https://www.researchgate.net/deref/http%3A%2F%2Fdx.org%2D10.1049%2Fiet-cps.2019.0031.

Kerres et al., Economic Evaluation ofMaintenance Strategies for Wind Turbines: A Stochastic Analysis, The Institution of Engineering and Technology (IET), Journals & Magazines, IET Renewable Power Generation, vol. 9, Issue 7, Sep. 2015, pp. 766-774. (Abstract Only) https://doi.org/10.1049/iet-rpg.2014.0260.

Knowles et al., A Survey of Cyber Security Management in Industrial Control Systems, International Journal of Critical Infrastructure Protection, vol. 9, 2015, pp. 52-80. http://dx.doi.org/10.1016/j.ijcip.2015.02.002.

Kosek et al., Ensemble Regression Model-based Anomaly Detection for Cyber-Physical Intrusion Detection in Smart Grids, 2016 IEEE Electrical Power and Energy Conference (EPEC), 2016, Ottawa, ON Canada. (Abstract Only) https://doi.org/10.1109/EPEC.2016.7771704.

Li et al., Data Driven Condition Monitoring of Wind Power Plants Using Cluster Analysis, IEEE, 2015 International Conference on Cyber-Enabled Distributed Computing and Knowledge Discovery, 2015, Xi'an China. (Abstract Only) https://doi.org/10.1109/CyberC.2015.16.

Maniere et al., Challenges of Machine Learning Based Monitoring for Industrial Control System Networks, Advanced Information Networking and Applications Workshops (WAINA), 2012 26th International Conference, Fukuoka, Mar. 26-29, 2012, pp. 968-972.

(56) References Cited

OTHER PUBLICATIONS

Mohammadpourfard et al., Identication of False Data Injection Attacks with Considering the Impact of Wind Generation and Topology Reconfigurations, IEEE, Journals & Magazines, IEEE Transactions on Sustainable Energy, vol. 9, Issue 3, Jul. 2018, pp. 1349-1364. (Abstract Only) https://doi.org/10.1109/TSTE.2017.2782090.
Nalavade et al., Finding Frequent Itemsets using Apriori Algorihm to Detect Intrusions in Large Dataset, International Journal of Computer Applications & Information Technology, vol. 6, Issue 1, Jun.-Jul. 2014, pp. 84-92.
Nath, Low Latency Anomaly Detection with Imperfect Models, Dissertation University of Arkansas, May 2020, 24 pages.
Qian et al., A Novel Wind Turbine Condition Monitoring Method Based on Cloud Computing, Science Direct, Renewable Energy, vol. 135, May 2019, pp. 390-398. (Abstract Only) https://doi.org/10.1016/j.renene.2018.12.045.
Rasmussen et al., Application of Functional Modeling for Monitoring of WTG in a Cyber-Physical Environment, ResearchGate, IET Cyber-Physical Systems Theory & Applications, vol. 4, Jul. 2018, 9 Pages. https://www.researchgate.net/deref/http%3A%2F%2Fdx.doi.org%2F10.1049%2Fiet-cps.2017.0109.
Rezamand et al., A New Hybrid Fault Detection Method for Wind Turbine Blades Using Recursive PCA and Wavelet-Based PDF, IEEE, Journals & Magazines, Sensors Journal, vol. 20, Issue 4, Feb. 15, 2020, pp. 2023-2033. (Abstract Only) https://doi.org/10.1109/JSEN.2019.2948997.
Skormin et al., The Behavioral Approach to Diagnostics of Cyber-Physical Systems, AUTORESTCON, 2014 IEEE, St. Louis, MO, Sep. 15-18, 2014, pp. 26-30.
Vanini et al., Fault Detection and Isolation of a Dual Spool Gas TurbineEngine Using Dynamic Neural Networks and Multiple Model Approach, ScienceDirect, vol. 259, Feb. 20, 2014, pp. 234-251. (Abstract Only) https://doi.org/10.1016/j.ins.2013.05.032.
Vencore Labs, Vencore Labs to Assist DARPA in Protecting the Nation's Electrical Grid, PR Newswire a cision Company, Chantilly, VA, Sep. 13, 2016, 2 Pages. https://www.econline.com/doc/vencore-labs-to-assist-darpa-in-protecting-the-nation-s-electrical-grid-0001.
Xu et al., Adaptive Fault Detection in Wind Turbine Via RF and CUSUM, the Institution of Engineering and Technology (IET), Journals & Magazines, IET Renewable Power Generation, vol. 14, Issue 10, Jul. 27, 2020, pp. 1789-1796. (Abstract Only) https://doi.org/10.1049/iet-rpg.2019.0913.
Yampikulsakul et al., Condition Monitoring of Wind Power System with Nonparametric Regression Analysis, IEEE Transactions on Energy Conversion, vol. 29, Issue 2, Jun. 2014, pp. 288-299.
Yan et al., On Accurate and Reliable Anomaly Detection for Gas Turbine Combustors: A Deep Learning Approach, Annual Conference of the Prognostics and Health Management Society, 2015, pp. 1-8.
Yi et al., Discriminative Feature Learning for Blade Icing Fault Detection of Wind Turbine, IOP Science, Measurement Science and Technology, 115102, vol. 31, No. 11, Aug. 25, 2020. (Abstract Only) https://doi.org/10.1088/1361-6501/ab9bb8.
Yu, Unsupervised Machine Learning Anomaly Detection for Multivariate Time-Series Data in Wind Turbine Converters, Theseus, May 2020, 63 Pages.
Zhang et al., A Data-Driven Design for Fault Detection of Wind Turbines Using Random Forests and XGboost, IEEE, Journals & Magazines, vol. 6, 2018, pp. 21020-21031. https://doi.org/10.1109/ACCESS.2018.2818678.
Li Xuan et al., Asset-Based Dynamic Impact Assessment of Cyberattacks for Risk Analysis in Industrial Control Systems, IEEE Transactions on Industrial Informatics, IEEE Service Center, New York, NT, US, vol. 14, No. 2, Feb. 2018, pp. 608-618.

\* cited by examiner

SYSTEMS AND METHODS FOR CONTROLLING AN INDUSTRIAL ASSET IN THE PRESENCE OF A CYBER-ATTACK

STATEMENT REGARDING FEDERALLY SPONSORED RESEARCH OR DEVELOPMENT

This invention was made with Government support under Contract No. DE-OE0000902 awarded by the U.S. Department of Energy (DOE). The Government has certain rights in the invention.

FIELD

The present disclosure relates in general to industrial assets, and more particularly to systems and methods for the control of an industrial asset in the presence of a cyber-attack.

BACKGROUND

As disclosed herein, industrial assets may take a variety of forms. Accordingly, the industrial asset may include assets directed to the aviation industry, the nuclear industry, the petroleum industry, industrial infrastructure (e.g., pipelines and/or pumping stations), and/or the power generation industry. For example, the industrial asset may be a power generating asset and may include assets which rely on renewable and/or nonrenewable sources of energy.

Those power generating assets which rely on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

Certain industrial assets, such as renewable energy power generating assets, may be characterized by the stochastic nature of various variables affecting the operations of the industrial asset. As such, the industrial asset may be targeted by cyber-attacks. The cyber-attacks may have a number of objectives which may be detrimental to the components of the industrial asset, the operations of the industrial asset, and/or the output of the industrial asset. For example, the cyber-attacks may have objectives directed to reducing a magnitude and/or quality of an output of the industrial asset, an unwanted shutdown, accelerated wear of components of the industrial asset, structural damage, and/or the destruction of the industrial asset. It should be appreciated that such objectives may be contrary to the desired employment of the industrial asset and may result in increased costs and/or lost profits. Accordingly, it may be desirable to detect and neutralize/mitigate the impacts of a cyber-attack.

Thus, the art is continuously seeking new and improved systems and methods that address the aforementioned issues. As such, the present disclosure is directed to systems and methods controlling an industrial asset in the presence of a cyber-attack.

BRIEF DESCRIPTION

Aspects and advantages of the invention will be set forth in part in the following description, or may be obvious from the description, or may be learned through practice of the invention.

In one aspect, the present disclosure is directed to a method for controlling an industrial asset. The method may include generating, via a controller, a cyber-attack model configured to predict a plurality of operational impacts on the industrial asset of a plurality of potential cyber-attacks and a corresponding plurality of potential mitigation responses. The method may also include training, via the controller, the cyber-attack model via a training data set to correlate the plurality of potential mitigation responses to the predicted plurality of operational impacts corresponding to the plurality of potential cyber-attacks. Additionally, a cyber-attack neutralization model (neutralization model) may detect a cyber-attack impacting at least one component of the industrial asset. The neutralization model may identify a predicted operational impact of the plurality of operational impacts which corresponds to the detected cyber-attack based on the cyber-attack model. As such, the neutralization model may select at least one mitigation response of the plurality of mitigation responses based on the predicted operational impact of the cyber-attack. Additionally, an operating state of the industrial asset may be altered based on the selected mitigation response(s).

In an embodiment, detecting the cyber-attack may also include identifying an attack point of the cyber-attack via an attack-detection-localization (ADL) module of the neutralization module. The attack point may correspond to a first sensor, a first actuator, and/or a system controller of the industrial asset.

In an additional embodiment, the attack point may correspond to an affected output signal of the first sensor. In such an embodiment, selecting the mitigation response(s) may include filtering the affected output signal so as to preclude a utilization of the affected output signal by the system controller to affect the operating state of the industrial asset. Additionally, the system controller may generate a set point for the industrial asset based, at least in part, on an alternative signal obtained from a second sensor.

In a further embodiment, determining the predicted operational impact may include determining, via the ADL module, a severity score for the cyber-attack. Accordingly, the selection of the mitigation response(s) may be based, at least in part, on the severity score.

In yet a further embodiment, the mitigation response(s) may include emulating, via a system emulator, a nominal operating state of the industrial asset in response to an operating condition affecting the industrial asset. Additionally, the method may include generating at least one output of the system emulator corresponding to an input where output of the first sensor, the first actuator, and/or the system controller of the industrial asset in the absence of a cyber-attack.

In an embodiment, the attack point may correspond to an affected command signal for the first actuator. As such, replacing the input and/or output subject to the cyber-attack may include filtering the affected command signal and generating a replacement command signal for the first actuator via the system emulator.

In an additional embodiment, the attack point may correspond to an affected feedback signal of the first actuator. As such, replacing the input and/or output subject to the cyber-attack may include filtering the affected feedback signal. Further, the emulation may include modeling a replacement feedback signal for the first actuator via an actuator emulator of the system emulator. Additionally, the replacement feedback signal may be delivered to the system controller and a command signal for the first actuator may be generated based, at least in part, on the replacement feedback signal.

In a further embodiment, the attack point may correspond to a system controller. As such, replacing the input and/or output subject to the cyber-attack may include filtering and output of the system controller so as to preclude the system controller from affecting the operating state of the industrial asset. Additionally, the emulation may include generating, via a controller emulator of the system emulator, at least one setpoint command configured to establish or maintain and operation of the industrial asset by altering the operating state of the industrial asset.

In yet a further embodiment, the attack point may correspond to an affected output signal of the first sensor. As such, replacing the input and/or output subject to the cyber-attack may include receiving, via the system emulator, an unaffected output signal from at least a second sensor. Additionally, a replacement output signal for the first sensor may be generated via a sensor emulator of the system emulator based, at least in part, on the unaffected output signal, and the replacement output signal may be delivered to the system controller.

In an embodiment, the second sensor may be positioned separate from the industrial asset.

In an additional embodiment, determining the predicted operational impact of the detected cyber-attack may include correlating, via the neutralization module, the predicted operational impact to an impact on an output of the industrial system delivered to a connected system. Additionally, at least one output of the system emulator may be utilized to mitigate the impact of the cyber-attack on the output of the industrial system.

In a further embodiment, mitigating the impact of the cyber-attack on the output of the industrial system may include derating the industrial system.

In yet a further embodiment, determining the predicted operational impact of the detected cyber-attack may include correlating, via the neutralization module, the predicted operational impact to an accumulation of damage to a component of the industrial asset. As such, the industrial asset may be derated to mitigate the accumulation of damage.

In an embodiment, determining the predicted operational impact of the detected cyber-attack may include correlating, via the neutralization module, the predicted operational impact to an unwanted shutdown of the industrial asset in response to a shutdown protocol of a safety system in response to the detected cyber-attack. The shutdown protocol may be unwarranted for the operating state of the industrial asset. As such, the neutralization module may override the shutdown protocol to preclude the unwarranted shutdown of the industrial asset.

In an additional embodiment, the industrial asset may be a wind turbine.

In another aspect, the present disclosure is directed to a system for controlling an industrial asset. The system may include at least one sensor and at least one actuator operably coupled to the industrial asset, and a system controller communicatively coupled to the sensor(s) and the actuator (s). The controller may include at least one processor configured to perform a first plurality of operations so as to affect an operating state of the industrial asset. Additionally, the system may include a neutralization module operably coupled to the sensor(s), the actuator(s), the system controller. The neutralization module may include at least one processor configured to perform a second plurality of operations. The second plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
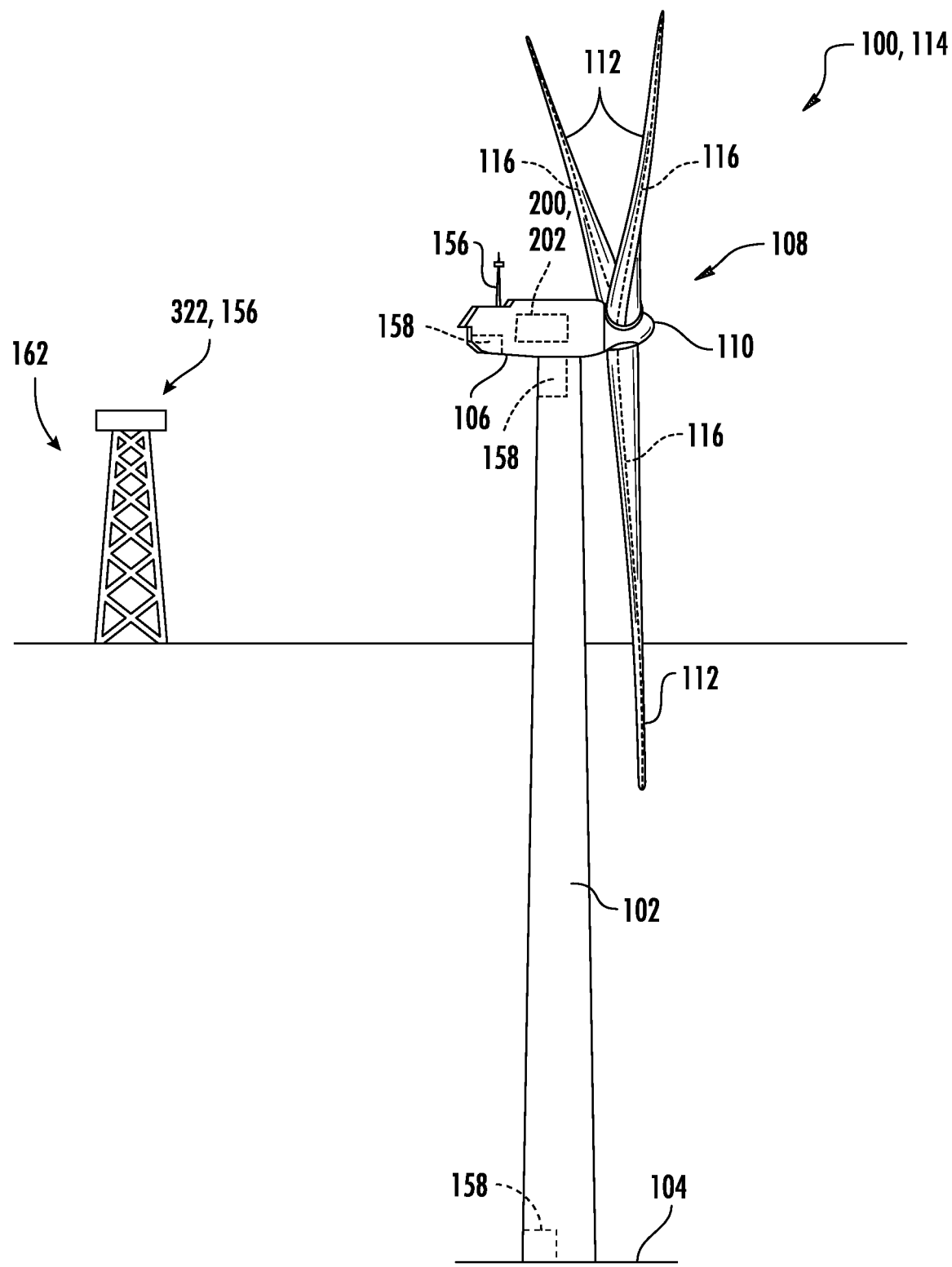
FIG. 1 illustrates a perspective view of one embodiment of an industrial asset configured as a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling an industrial asset in the presence of a cyber-attack. In other words, the systems and methods disclosed herein are directed to the response of an industrial asset to a cyber-attack. The industrial asset may, for example, be a power generating asset (e.g. a wind turbine, the solar plant, a hydroelectric plant, a fuel-fired power plant, etc.), an electrical grid, a pumping station, a pipeline, a refinery, a nuclear facility, an aviation asset, and/or other similar asset.

The various potential cyber-attacks directed toward the industrial asset may affect different components, signals, and/or operations of the industrial asset. Accordingly, the potential cyber-attacks generally affect an input or an output of a component of the industrial asset in order to impact the operations of the industrial asset.

The components, signals, and/or operations of the industrial asset targeted by the cyber-attacks may be selected and the cyber-attack may be tailored based on the desired objective of the cyber-attack. The objectives of the cyber-attack may, for example, include triggering an unplanned/undesirable shutdown of the industrial asset, reducing an output of the industrial asset, and/or modifying the output of the industrial asset so as to affect a connected system (e.g., reducing the output of a wind farm to impact the connected electrical grid). Additionally, the objectives of the cyber-attack may, for example, include causing physical damage to the industrial asset, such as by adjusting the operating parameters (e.g., a rotational speed, cooling status, brake status, etc.) of a component of the industrial system to increase the wearing of a component of the industrial asset and/or cause catastrophic damage to the industrial asset or a component thereof.

In order to achieve the objective of the cyber-attack, the cyber-attack may seek to affect the operation of the industrial asset by directing the attack to a sensor signal. In such an instance, the cyber-attack may seek to alter/corrupt the output of at least one sensor as seen by the system controller. This may result in the parameter reported by the sensor(s) being different (e.g. having a different magnitude) than would be reported by the sensor(s) when not being affected by a cyber-attack (e.g, under nominal operating conditions). For example, the cyber-attack may target an environmental sensor so that a wind speed reported by the environmental sensor is different than the true wind speed affecting the industrial asset (e.g., a wind turbine).

It should be appreciated that if corrupted sensor signals are utilized in making control determinations for the industrial asset, the industrial asset may be operated in a suboptimal manner. As such, the systems and methods disclosed herein may be employed to mitigate the effects of the cyber-attack by preventing the utilization of the corrupted/altered output signal and by providing an alternative signal to the system controller.

Similarly, the cyber-attack may seek to affect the operation of the industrial asset by directing the attack to a feedback signal from at least one actuator. In such an instance, the cyber-attack may seek to alter/corrupt the feedback signal delivered to the system controller. This may result in the operating state (e.g., position, orientation, etc.) of the actuator(s) reported to the system controller being different than the actual operating state of the actuator(s).

For example, in a wind turbine, a cyber-attack may seek to corrupt the feedback signal of the pitch control system such that the pitch of the rotor blades reported to the system controller is less than the actual pitch of the rotor blades. In such an instance, the system controller may command the pitch system to increase the pitch of the rotor blade to an optimal setpoint. However, since the pitch of the rotor blades may have already been at an optimal setpoint, the increase in pitch may result in a pitch angle which is too high for the current environmental conditions.

Operating the wind turbine with a rotor blade pitched too high for the environmental conditions may result in numerous effects detrimental to the operation of the wind turbine, such as a rotor imbalance, an overspeed event, rotor blade stall, etc. Accordingly, it should be appreciated that if corrupted/altered feedback signals are utilized in generating actuator commands, the industrial asset may be operated in a suboptimal manner. As such, the systems and methods disclosed herein may be employed to mitigate the effects of the cyber-attack by preventing the utilization of the corrupted/altered feedback signal by providing an alternative signal to the system controller from a system emulator.

By way of additional illustration, the cyber-attack may seek to affect the operation of the industrial asset by directing the attack to the command signals from the system controller to an actuator. The corrupted/altered command signal may result in the actuator placing a component of the industrial asset in an operating state different from the operating state directed by the system controller. This may result in less-than-optimal operations of the industrial asset for the given conditions, increased wear of the component, and/or damage to the industrial asset. Accordingly, it may be desirable to employ the systems and methods disclosed herein to filter the corrupted/altered command signal and replace it with a replacement command signal generated by a system emulator.

As a further illustration, the cyber-attack may seek to affect the operation of the industrial asset by directing the attack to the system controller so that the system controller generates command signals which deviate from those expected from a system controller not under cyber-attack. Accordingly, it may be desirable to employ the systems and methods disclosed herein to isolate the system controller in order to preclude the system controller from controlling, or failing to control, the operations of the industrial asset. With the system controller isolated, the control of the industrial asset may, in accordance with the present disclosure, transfer to the system emulator. The system emulator may receive sensor input(s) which may have otherwise have been provided to the system controller and may generate the command signal(s) for the actuator(s) which would have otherwise been generated by the system controller in the absence of the cyber-attack.

Referring now to the drawings, FIG. 1 illustrates a perspective view of one embodiment of an industrial asset 100 according to the present disclosure. As shown, the industrial asset 100 may be configured as a power generating asset, such as a wind turbine 114. In an additional embodiment, when configured as a power generating asset, the industrial asset 100 may, for example, be configured as a solar power generating asset, a hydroelectric plant, a fossil fuel generator, and/or a hybrid power generating asset. However, in further embodiments, the industrial asset 100 may be configured as an electrical grid, a pumping station, a pipeline, a refinery, a nuclear facility, an aviation asset, and/or other similar asset.

When configured as a wind turbine 114, the industrial asset 100 may generally include a tower 102 extending from a support surface 104, a nacelle 106, mounted on the tower 102, and a rotor 108 coupled to the nacelle 106. The rotor 108 may include a rotatable hub 110 and at least one rotor blade 112 coupled to, and extending outwardly from, the hub 110. For example, in the illustrated embodiment, the rotor 108 includes three rotor blades 112. However, in an additional embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The industrial asset 100 may also include a system controller 202. When configured as a wind turbine 114, the system controller 202 may be configured as a turbine controller centralized within the nacelle 106. However, in other embodiments, the system controller 202 may be located within any other component of the wind turbine 114 or at a location outside the wind turbine. Further, the system controller 202 may be communicatively coupled to any number of the components of the industrial asset 100 in order to control the components. As such, the system controller 202 may include a computer or other suitable processing unit. Thus, in several embodiments, the system controller 202 may include suitable computer-readable instructions that, when implemented, configure the system controller 202 to perform various different functions, such as receiving, transmitting and/or executing wind turbine control/command signals. Additionally, the industrial asset 100 may include a plurality of actuators 160 which are configured to implement the various command signals and affect an operating state of the industrial asset 100. It should be appreciated that, as used herein, the "operating state" may refer to a physical configuration, orientation, and/or operating status of the industrial asset 100 or a component thereof.

Figure 2:
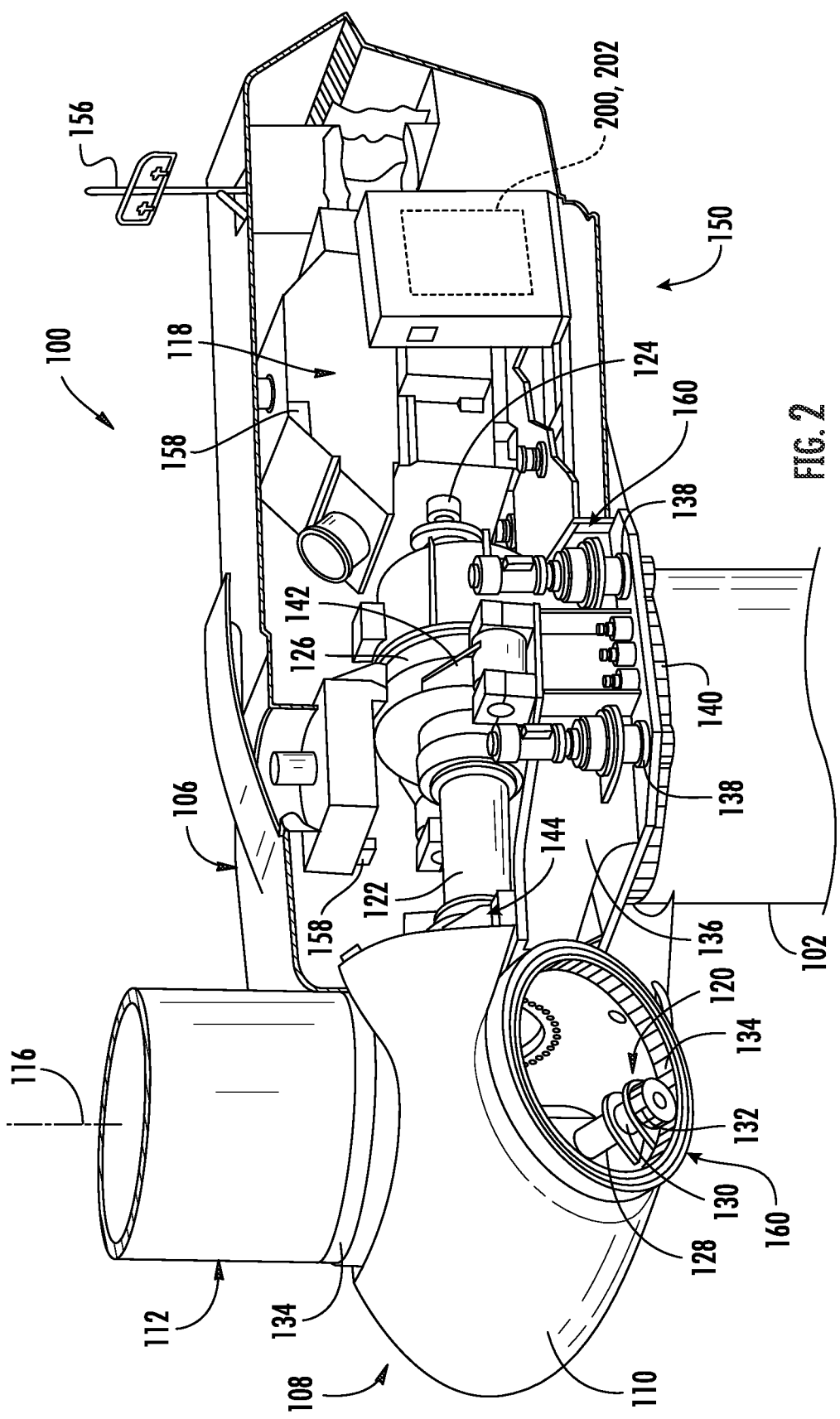
FIG. 2 illustrates a perspective, internal view of one embodiment of a nacelle of the wind turbine of FIG. 1 according to the present disclosure.
Figure 3:
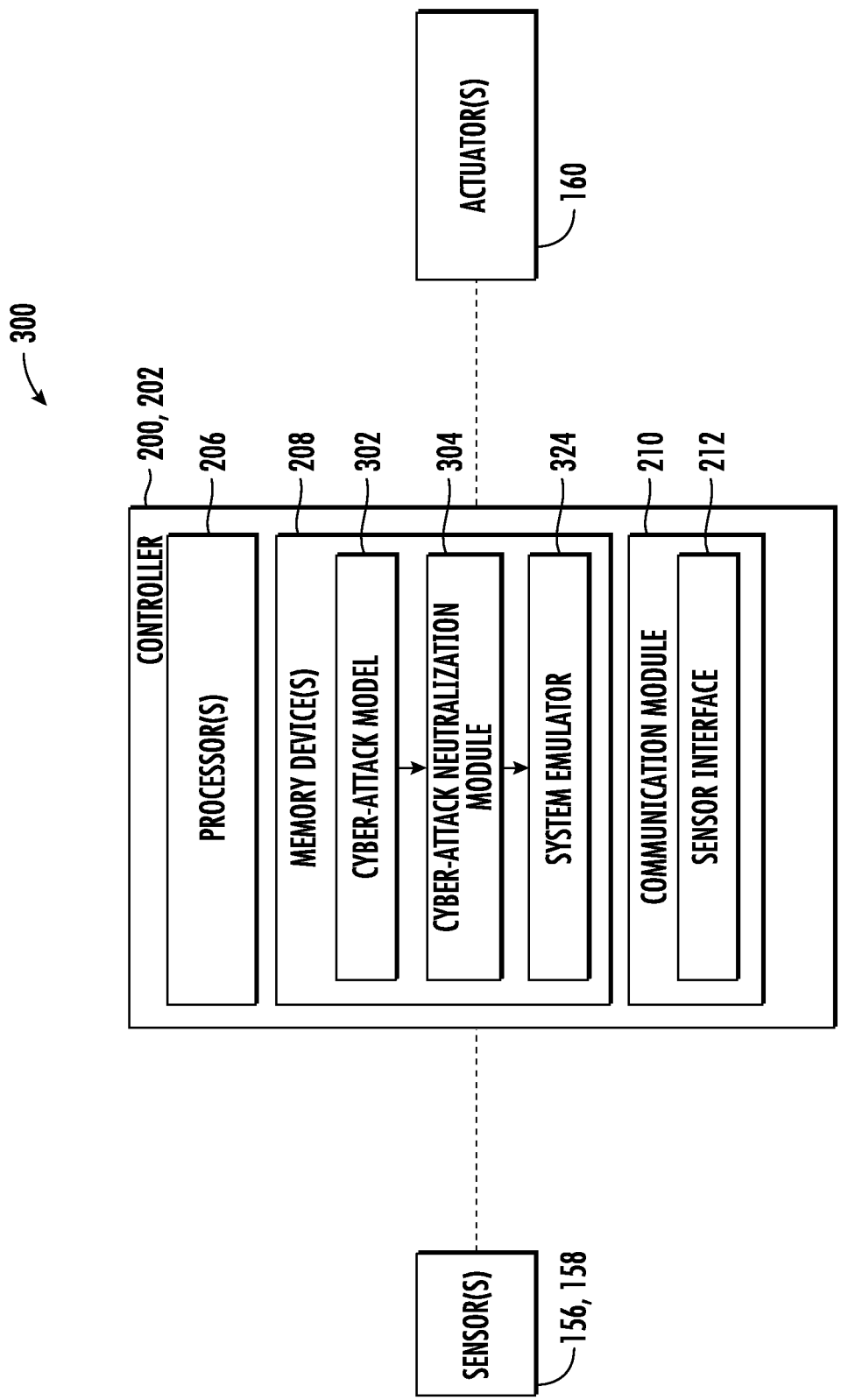
FIG. 3 illustrates a block diagram of one embodiment of a controller for use with the industrial asset according to the present disclosure.
Figure 4:
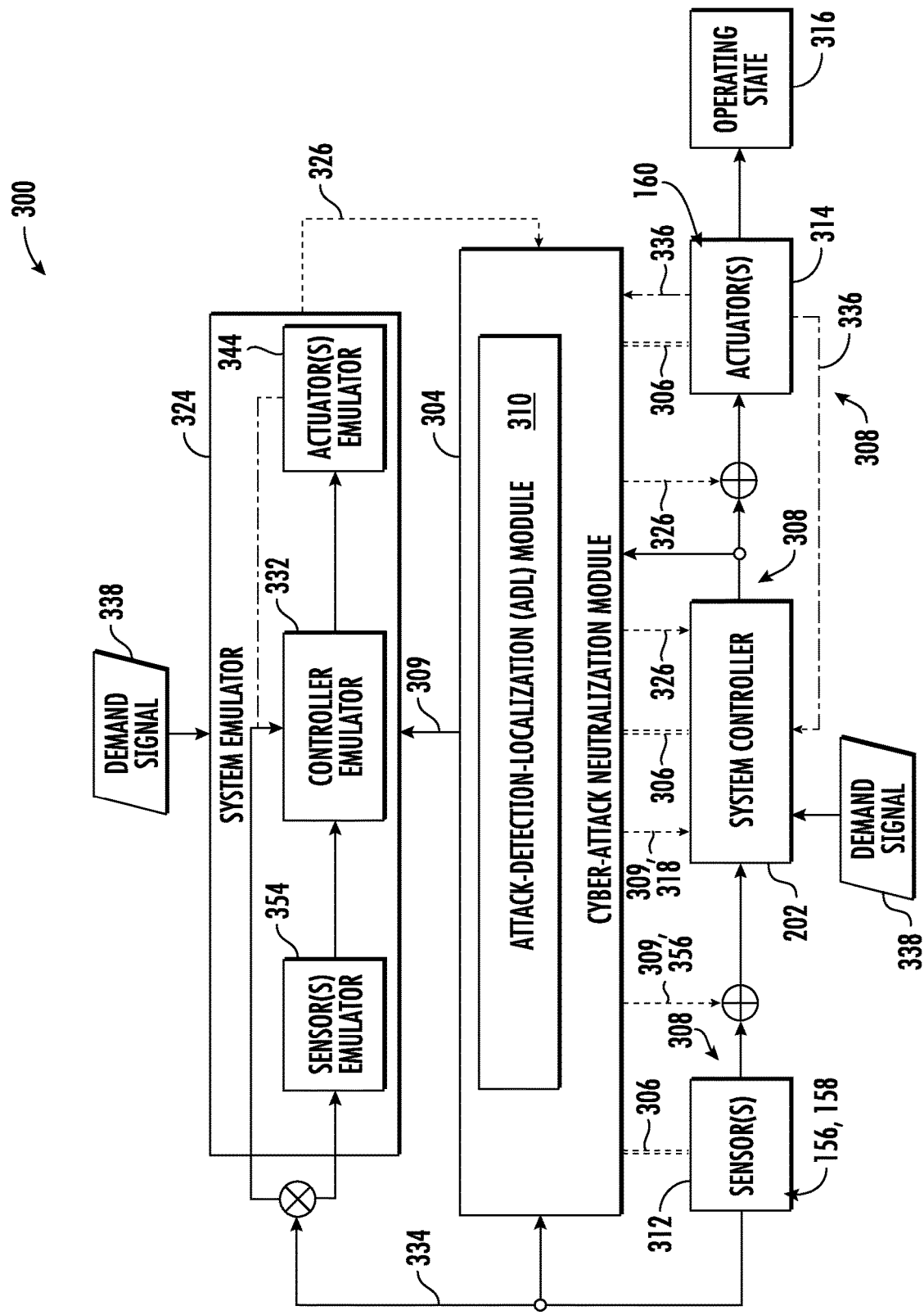
FIG. 4 illustrates a schematic of a system for controlling the industrial asset in the presence of a cyber-attack according to the present disclosure.

Referring now to FIG. 2, a simplified, internal view of one embodiment of the nacelle 106 of the wind turbine 114 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Each rotor blade 112 may also include a pitch control mechanism 120 configured to rotate each rotor blade 112 about its pitch axis 116. Each pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

It should be appreciated that pitching the rotor blade(s) 112 about the pitch axis 116 may alter an angle of attack between the rotor blade(s) 112 and an apparent wind. Accordingly, the rotor blade(s) 112 may pitch to feather when the rotor blade(s) 112 rotates about the pitch axis 116 towards alignment with the apparent wind and to power when the rotor blade(s) rotates towards an orientation generally perpendicular to the apparent wind. It should be further appreciated that pitching to feather generally depowers the rotor blade(s) 112 as a result of a reduction in the resultant lift.

Similarly, the wind turbine 114 may include one or more yaw drive mechanisms 138 communicatively coupled to the system controller 202, with each yaw drive mechanism(s) 138 being configured to change the angle of the nacelle 106 relative to the wind (e.g., by engaging a yaw bearing 140 of the wind turbine 114). It should be appreciated that the system controller 202 may direct the yawing of the nacelle 106 and/or the pitching of the rotor blades 112 so as to aerodynamically orient the wind turbine 114 relative to a wind acting on the wind turbine 114, thereby facilitating power production.

In an embodiment, the industrial asset 100 may include an environmental sensor 156 configured for gathering data indicative of one or more environmental conditions. The environmental sensor 156 may be operably coupled to the system controller 202. Thus, in an embodiment, the environmental sensor(s) 156 may, for example, be a wind vane, an anemometer, a lidar sensor, thermometer, barometer, or any other suitable sensor. The data gathered by the environmental sensor(s) 156 may include measures of wind speed, wind direction, wind shear, wind gust, wind veer, atmospheric pressure, and/or ambient temperature. In at least one embodiment, the environmental sensor(s) 156 may be mounted to the industrial asset 100 (e.g., to the nacelle 106 at a location downwind of the rotor 108). For example, the environmental sensor(s) 156 may, in alternative embodiments, be coupled to, or integrated with, the rotor 108 and/or positioned within the nacelle 106.

In an additional embodiment, the environmental sensor(s) 156 may be positioned separate from the industrial asset 100. For example, the environmental sensor(s) 156 may be a meteorological mast displaced some distance from the industrial asset 100. Additionally, the environmental sensor(s) 156 may be coupled to and additional asset, or subsystem of the industrial asset 100, such as a second wind turbine of a wind farm. It should also be appreciated that the environmental sensor(s) 156 may include a network of sensors and may be positioned away from the industrial asset 100.

In addition, the industrial asset 100 may include a at least one operational sensor 158. The operational sensor(s) 158 may be configured to detect a performance of the industrial asset 100, e.g. in response to the environmental condition. For example, the operational sensor(s) 158 may be a rotational speed sensor, a position sensor, an acceleration sensor, and/or an output sensor operably coupled to the system controller 202. The operational sensor(s) 158 may be directed at, or integral with, any suitable component of the industrial asset 100. For example, the operational sensor(s) 158 may be directed at the rotor shaft 122 of the wind turbine 114 and/or the generator 118. The operational sensor(s) 158 may gather data indicative of the rotational speed and/or rotational position of the rotor shaft 122, or any other shaft of the industrial asset 100, and thus the rotor 108, or a pump, in the form of a rotor speed, a rotor azimuth, and/or any other suitable measurement. The operational sensor(s) 158 may, in an embodiment, be an analog tachometer, a D.C. tachometer, an A.C. tachometer, a digital tachometer, a contact tachometer a non-contact tachometer, or a time and frequency tachometer. In an embodiment, the operational sensor(s) 158 may, for example, be an encoder, such as an optical encoder. Additionally, the operational sensor(s) 158 may be an ammeter, a voltmeter, an ohmmeter, and/or any other suitable sensor for monitoring an electrical condition of the industrial asset 100. Further, in an embodiment, the operational sensor(s) 158 may be a strain gauge, a proximity sensor, a LIDAR, and/or any other suitable sensor configured to detect a displacement of the industrial asset 100 or a component thereof.

It should also be appreciated that, as used herein, the term "monitor" and variations thereof indicates that the various sensors of the industrial asset 100 may be configured to provide a direct measurement of the parameters being monitored or an indirect measurement of such parameters. Thus, the sensors described herein may, for example, be used to generate signals relating to the parameter being monitored, which can then be utilized by the system controller 202 to determine a condition or response of the industrial asset 100 and/or a component thereof.

Referring now to FIGS. 3-8 multiple embodiments of a system 300 for controlling the industrial asset 100 according to the present disclosure are presented. As shown particularly in FIG. 3, a schematic diagram of one embodiment of suitable components that may be included within the system 300 is illustrated. For example, as shown, the system 300 may include a controller 200. The controller 200 may be employed to generate and train a cyber-attack model 302 configured to predict a plurality of operational impacts on industrial asset 100 of a plurality of potential cyber-attacks and the corresponding plurality of potential mitigation response. The controller 200 may also be configured to implement a cyber-attack neutralization model (neutralization model) 304. Additionally, the controller 200 may be configured as the system controller 202. As such, the controller 200 may be employed off-line and/or in real time. Additionally, the controller 200 may be a single component located with the industrial assets. In an additional embodiment, the controller 200 may encompass more than one component located with industrial asset. In a further embodiment, the controller 200 may include additional components located at a distance from the industrial asset 100.

The controller 200 and/or the system controller 202 may be communicatively coupled to the environmental sensor(s) 156 and/or the operational sensor(s) 158. Further, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the industrial asset 100. Further, the communications module 210 may include a sensor interface 212 (e.g., one or more analog-to-digital converters) to permit signals transmitted from the sensor(s) 156, 158 to be converted into signals that can be understood and processed by the processors 206. It should be appreciated that the sensor(s) 156, 158 may be communicatively coupled to the communications module 210 using any suitable means. For example, the sensor(s) 156, 158 may be coupled to the sensor interface 212 via a wired connection. However, in other embodiments, the sensor(s) 156, 158 may be coupled to the sensor interface 212 via a wireless connection, such as by using any suitable wireless communications protocol known in the art. Additionally, the communications module 210 may also be operably coupled to at least one actuator 160 configured to implement a control action as directed by a command signal (e.g., a control vector).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, operating the industrial asset 100, generating and training a cyber-attack model, detecting a cyber-attack, and implementing a mitigation response based on a predicted operational impact of the cyber-attack as described herein, as well as various other suitable computer-implemented functions.

FIGS. 3-8 depict various aspects of a system 300 for controlling the industrial asset 100 in the presence of a cyber-attack. Accordingly, in an embodiment, the controller 200 may be configured to generate a cyber-attack model 302. The cyber-attack model 302 may be configured to predict a plurality of operational impacts on industrial asset 100 which may stem from a plurality of potential cyber-attacks. In an embodiment, the cyber-attack model 302 may also predict a plurality of potential mitigation responses which correspond to (e.g. minimize or counteract) the plurality of potential operational impacts that may be caused by the various potential cyber-attacks. It should be appreciated that the potential operational impacts may correspond to the objectives of the potential cyber-attacks. For example, the objectives of the cyber-attack may include less-than-optimal operations of the industrial asset 100 for the given conditions, increased wear of the component(s) of the industrial asset 100, and/or damage to the industrial asset 100.

It should be appreciated that the cyber-attack model 302 may be a mathematical representation of the system dynamics of the industrial asset 100. Accordingly, the cyber-attack model 302 may be derived from first principles or other means (e.g. data driven models). As such, the cyber-attack model 302 may be based on controller emulation. Additionally, the cyber-attack model 302 may be configured to determine the outcomes of various high-fidelity simulation scenarios describing the operations of the industrial asset 100. These simulation scenarios may include simulation runs wherein the industrial asset 100 is under cyber-attack. Additionally, the simulation scenarios may include simulation runs wherein the industrial asset 100 is operating under nominal operating conditions.

In an embodiment, the controller 200 may be configured to train the cyber-attack model 302 via a training data set. The training data set may include historical observations of the operations of the industrial asset 100, or components thereof. In an embodiment, the training data set may also include an engineering diagnostic expert system. The engineering diagnostic expert system may include manifestations of the engineering domain knowledge, such as troubleshooting guides, anomaly validation reports, after-action reports, design specifications, testing reports, cyber-attack reports, cyber-attack methodologies, and/or other captures of the experience and decision-making knowledge of a human expert. It should be appreciated that the training data set may include data indicative of both nominal operating states of the industrial asset 100 and operating states reflecting an impact of a cyber-attack.

The training of the cyber-attack model 302 may correlate each of the plurality of potential mitigation responses to the predicted plurality of operational impacts, which correspond to the plurality of potential cyber-attacks. In other words, the training of the cyber-attack model 302 may facilitate the predicting/identifying of a particular operational impact which may stem from a particular type of cyber-attack directed at a specific point of attack (e.g., the sensor(s) 156, 158; the system controller 202; and/or the actuator(s) 160). The training may then facilitate the determination of at least one response to the particular type of cyber-attack directed at the specific point of attack which mitigates/neutralizes the particular operational impact. The potential cyber-attacks and corresponding potential mitigation responses may be consolidated by the controller 200 into a database, a lookup table and/or a graphical representation.

By way of a non-limiting illustration, in an embodiment wherein the point of attack corresponds to a sensor signal, the cyber-attack may cause the system controller 202 to perceive that an operating temperature of a component is greater than a threshold. This perception may be desirable to the perpetrator of the cyber-attack in order to trigger an emergency shutdown (e.g. the operational impact) of the industrial asset 100. As such, a potential mitigation response may be the utilization of a substitute indication (e.g. a substitute sensor output) of the health of the industrial asset 100 and the overriding of a safety protocol which would otherwise direct the emergency shutdown. It should be appreciated that the perpetrators of a cyber-attack may select the mode and point of attack to achieve specific objectives which may be undesirable to the operator of the industrial asset. Accordingly, the efforts of the perpetrators of the cyber-attack may be countered via the systems and methods disclosed herein.

Referring particularly to FIGS. 4-8, wherein schematic diagrams of various embodiments of the system 300 are depicted. As illustrated, in an embodiment, a cyber-attack neutralization module 304 (neutralization module) may detect (as indicated by double-lines 306) a cyber-attack impacting at least one component (e.g., the sensor(s) 156, 158; the system controller 202; and/or the actuator(s) 160) of the industrial asset 100. As such, the neutralization module may be operably coupled to each of the sensor(s) 156, 158; the system controller 202; and/or the actuator(s) 160 during operations of the industrial asset 100.

The detection of the cyber-attack may include identifying an attack point 308 of the cyber-attack. In an embodiment, the neutralization module 304 may utilize an attack-detection-localization (ADL) module 310 to identify the component and/or signal subject to the cyber-attack. For example, the attack point 308 may correspond to a first sensor 312, a first actuator 314, and/or the system controller 202 of the industrial asset 100. It should be appreciated that in embodiment wherein the attack point corresponds to the first sensor 312 and/or the first actuator 314, the attack point 308 may correspond to an input or an output of the first sensor 312 and/or the first actuator 314. It should further be appreciated that the attack point 308 may correspond to a demand signal received by the system controller 202 from a connected system, such as an electrical grid coupled to a wind farm.

The detection and localization of the cyber-attack via the ADL module 310 is more fully described in U.S. patent application Ser. No. 15/988,515 and in U.S. Pat. No. 10,417,415. As such U.S. patent application Ser. No. 15/988,515 entitled "System and Method for Anomaly and Cyber-Threat Detection in a Wind Turbine" filed May 24, 2018 is incorporated herein by reference in its entirety for all purposes. Additionally, U.S. Pat. No. 10,417,415 entitled "Automated Attack Localization and Detection Using Feature Driven Dynamic Model" filed Apr. 4, 2017 is incorporated herein by reference in its entirety for all purposes.

Following the detection of the cyber-attack impacting at least one component of the industrial asset 100, the neutralization module 304 may identify a predicted operational impact of the cyber-attack. The predicted operational impact may be one of the plurality of operational impacts generated via the cyber-attack model 302. In other words, the neutralization module 304 may first determine the type of cyber-attack and the component(s) at which the cyber-attack is directed. The neutralization module 304 may then leverage the cyber-attack model 302 to determine the expected (e.g. predicted) operational impact which may result (if not neutralized/mitigated) from the type of cyber-attack targeted at the identified attack point 308.

In an embodiment, the identification of the predicted operational impact of the detected cyber-attack may facilitate the selection of at least one mitigation response (as indicated by arrows 309) by the neutralization module 304. The mitigation response(s) may be selected from the plurality of potential mitigation responses developed by the cyber-attack model 302. In an embodiment, mitigation response(s) may be tailored to counteract the perceived objective of the perpetrator of the cyber-attack as indicated by the predicted operational impact. For example, in an embodiment, mitigating the impact of the cyber-attack may include derating the industrial asset 100. It should be appreciated that the mitigation response(s) may be implemented via secure/hardened communications protocols between the neutralization module 304 and the recipient of the mitigation response(s). It should further be appreciated that implementing the mitigation response(s) via secured/hardened means may reduce or eliminate the susceptibility of the mitigation response(s) to continued cyber-attack.

In an embodiment, the neutralization module 304 may correlate the predicted operational impact of the cyber-attack to an unwarranted shutdown of the industrial asset 100 in response to a shutdown protocol of a safety system triggered directly, or indirectly by the cyber-attack. The shutdown protocol may be unwarranted for the operating state of the industrial asset 100. In other words, the continued operation of the industrial asset 100 may pose no danger to the industrial asset 100; a component of the industrial asset 100; surrounding personnel, equipment, or facilities; and/or a connected system (e.g., a connected electrical grid). Accordingly, the initiation of the shutdown protocol by the safety system may be attributable to the cyber-attack. In such an embodiment, the mitigation response(s) may include control commands and/or inputs which may override a safety system and/or facilitate the continued operation of the industrial asset. As such, the neutralization module 304 may override the shutdown protocol to preclude the unwarranted shutdown of the industrial asset 100.

In an additional embodiment, the neutralization module 304 may correlate the predicted operational impact of the cyber-attack to the increased wearing (e.g. an accumulation of damage) of a component and/or other damage to the industrial asset 100. In such an embodiment, the mitigation response(s) may include altering an operating state 316 of the industrial asset, such as by altering an orientation of a component of the industrial asset 100, and/or derating the industrial asset 100 (to include initiating a controlled shutdown of the industrial asset 100). For example, in an embodiment, the derating the industrial asset 100 may mitigate the accumulation of damage to the industrial asset 100 or a component thereof.

By way of further illustration, in an embodiment, the predicted operational impact of the cyber-attack may correspond to an alteration of the output of the industrial asset 100 as delivered to a connected system (e.g., an electrical grid, a water/gas distribution network, etc.). For example, when configured as a wind turbine 114, the cyber-attack may seek to alter the power delivered by the wind turbine 114 to a connected electrical grid. As such, the cyber-attack may seek to alter a demand signal received from the electrical grid so that the wind turbine 114 delivers a quantity of power which deviates in some manner from that demanded by the electrical grid. For example, the operational impact of the cyber-attack may be that the quantity of power delivered to the electrical grid is more or less than an optimal amount demanded by the electrical grid and/or differs in form (e.g., frequency, voltage, amperes, reactive power component, etc.). In such an embodiment, the mitigation response(s) implemented by the neutralization module 304 may include filtering the altered demand signal, determining an alternative indication of the nominal demand signal, delivering the alternative indication (arrow 318) to the system controller 202, and/or derating the industrial asset 100.

Following the selection of the mitigation response(s), the operating state 316 of the industrial asset 100 may be altered. The alteration of the operating state 316 may be based on the selected mitigation response(s). It should be appreciated that the alteration of the operating state 316 may be accomplished to mitigate/counteract the predicted operational impact of the detected cyber-attack. As such, in an embodiment, the alteration of the operating state 316 may include reestablishing a pre-attack operating state for an affected component and/or signal. However, in an additional embodiment, the alteration of the operating state 316 may include establishing a post-attack operating state which differs from a pre-attack operating state and is configured to mitigate the predicted operational impact of the detected cyber-attack.

In an embodiment, determining the predicted operational impact of the cyber-attack may also include determining a severity score for the cyber-attack via the ADL module 310. As such, the selection of the mitigation response(s) may be based, at least in part, on the severity score. The severity score may, in an embodiment, correspond to a physical damaging of the industrial asset 100, an impact on a connected system, a duration of the operational impact on the industrial asset 100, a recovery cost associated with returning the industrial asset to a nominal operating state, and/or other similar effect associated with the predicted operational impact. For example, the severity score for a cyber-attack directed to a temporary reduction of the output of the industrial asset 100 may be lower than the severity score for a cyber-attack having the damaging of the industrial asset 100 as its objective. Accordingly, when the severity score is relatively low, the mitigation response(s) may include continuing operations of the industrial asset 100, even if at a reduced level. However, when the severity score is relatively high, the mitigation response(s) may include decoupling the industrial asset from a connected system and/or idling, parking, or otherwise shutting down the industrial asset 100.

Figure 5:
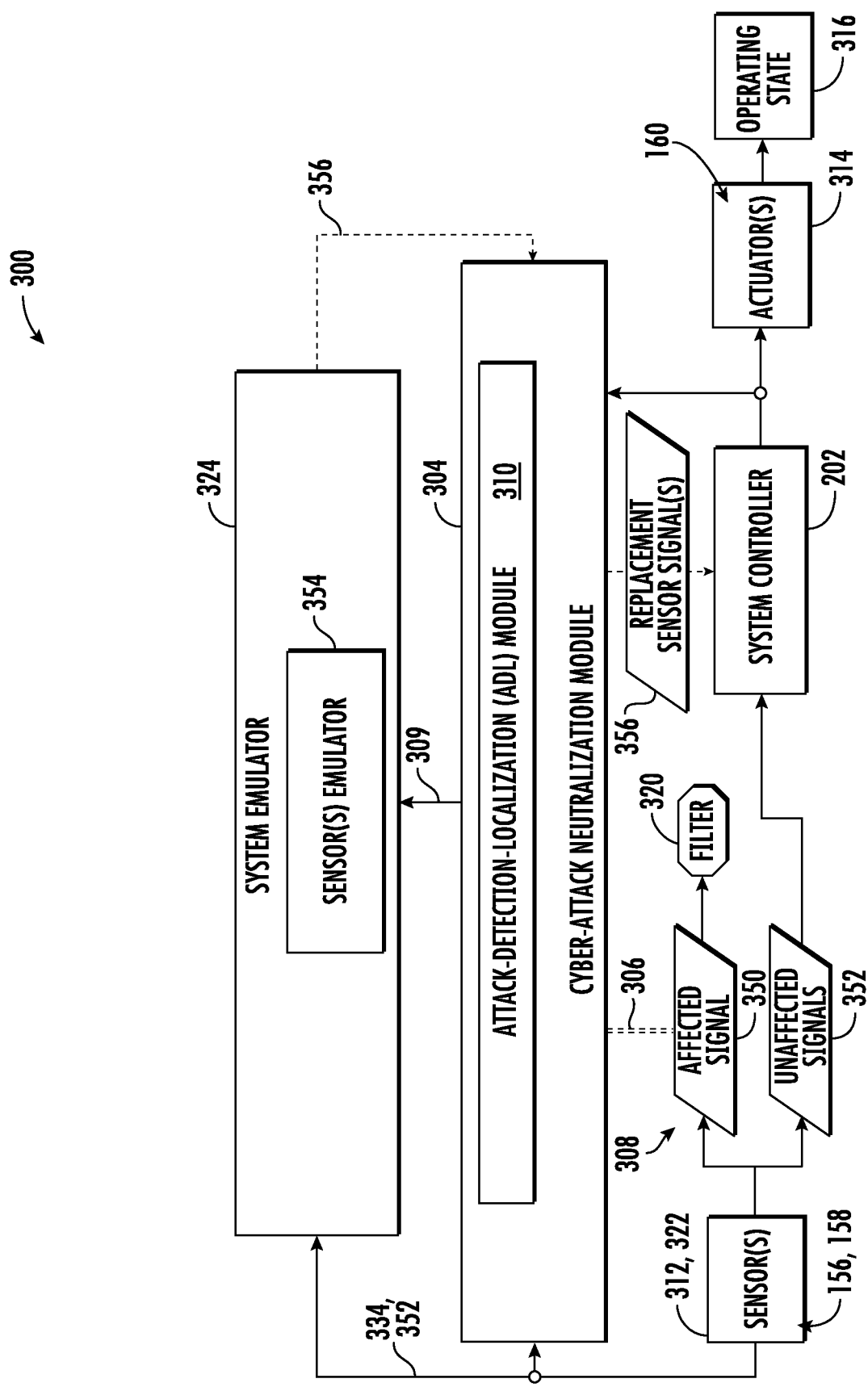
FIG. 5 illustrates a schematic of a portion the system of FIG. 4 for controlling the industrial asset in the presence of a cyber-attack affecting a sensor according to the present disclosure.

In an embodiment, the attack point 308 may correspond to an affected output signal of the first sensor 312. In such an embodiment, the mitigation response(s) may include filtering the affected output signal via a filter 320 (FIG. 5). Filtering the affected output signal may preclude the utilization of the affected output signal by the system controller 202 to affect the operating state 316 of the industrial asset 100. In an embodiment, the mitigation response(s) may also include generating, via the system controller 202, a set point for the industrial asset 100 based, at least in part, on an alternative signal (e.g. an alternative sensor signal) obtained from a second sensor 322.

It should be appreciated that the second sensor 322 may, in an embodiment, be an additional, unaffected sensor of the industrial asset 100. For example, when the industrial asset 100 is configured as the wind turbine 114, the first sensor 312 may be a pitch sensor monitoring the pitch of one of the rotor blades 112, and the second sensor 322 may be a pitch sensor monitoring another of the rotor blades 112.

It should also be appreciated that the first and second sensors 312, 322 may monitor different operating parameters of the industrial asset 100 and/or environmental parameters affecting the industrial asset 100. As such, the system controller 202 may derive a surrogate for the first sensor signal from the sensor signal from the second sensor 322. For example, a surrogate of the rotational speed of the generator 118 may be derived from a rotational speed of the rotor shaft 122 of the wind turbine 114.

It should further be appreciated that the second sensor 322 may be positioned at a distance separate from the industrial asset 100. For example, the second sensor 322 may be environmental and/or operational sensor 156, 158 coupled to an additional industrial asset, such as an additional wind turbine 114 of a wind farm. Additionally, the second sensor 322 may, in an embodiment, be configured as a separate sensing system, such as a meteorological mast 162 of a wind farm.

Referring still to FIG. 4-8, in an embodiment, mitigating the predicted operational impact of the cyber-attack may include emulating, via a system emulator 324 a nominal operating state of the industrial asset 100 in response to the operating conditions affecting the industrial asset 100. The system emulator 324 may utilize model-based techniques to continuously emulate the operations of the industrial asset in response to the actual operating conditions affecting the industrial asset 100. In other words, the system emulator 324 may be considered to be a "digital ghost," "digital replica," or "digital mirror" of the industrial asset 100. As such, the system emulator 324 may be operably coupled to the sensors, actuators, and/or controllers of the industrial asset 100, as well as any connected systems and/or external sensor systems. It should be appreciated that the system emulator 324 may be configured to digitally duplicate all aspects of the industrial asset 100 such that the digital duplicate operates in a virtual environment in the same manner as the industrial asset 100 operates in the physical environment.

The system emulator 324 may be implemented by the controller 200 and may be separate from the system controller 202. In an embodiment, the system emulator 324 may employ model predictive control (MPC) and/or linear quadratic regulator (LQR) strategies. As such, the system emulator may employ mathematical representations of the system dynamics and can be derived from first principles or other means (e.g. data driven models). Accordingly, the system emulator 324 may be employed in the system 300 to generate at least one output 326 corresponding to a nominal input or output of the first sensor 312, the first actuator 314, and/or the system controller 202. In other words, the system emulator 324 may generate an output 326 which emulates a signal which has not been altered/corrupted by a cyber-attack. The output 326 may then replace the affected input or output signal. It should be appreciated that replacing the input or output signal affected by the cyber-attack with the output 326 from the system emulator 324 may mitigate the effects of the cyber-attack on the industrial asset 100.

For example, in an embodiment, the neutralization module 304 may correlate the predicted operational impact to an impact on an output of the industrial asset 100. The output may, in an embodiment, be delivered to a connected system (e.g., an electrical grid connected to the wind turbine 114). In such an embodiment, the output 326 of the system emulator 324 may be utilized to mitigate the impact of the cyber-attack on the output of the industrial asset 100.

Figure 7:
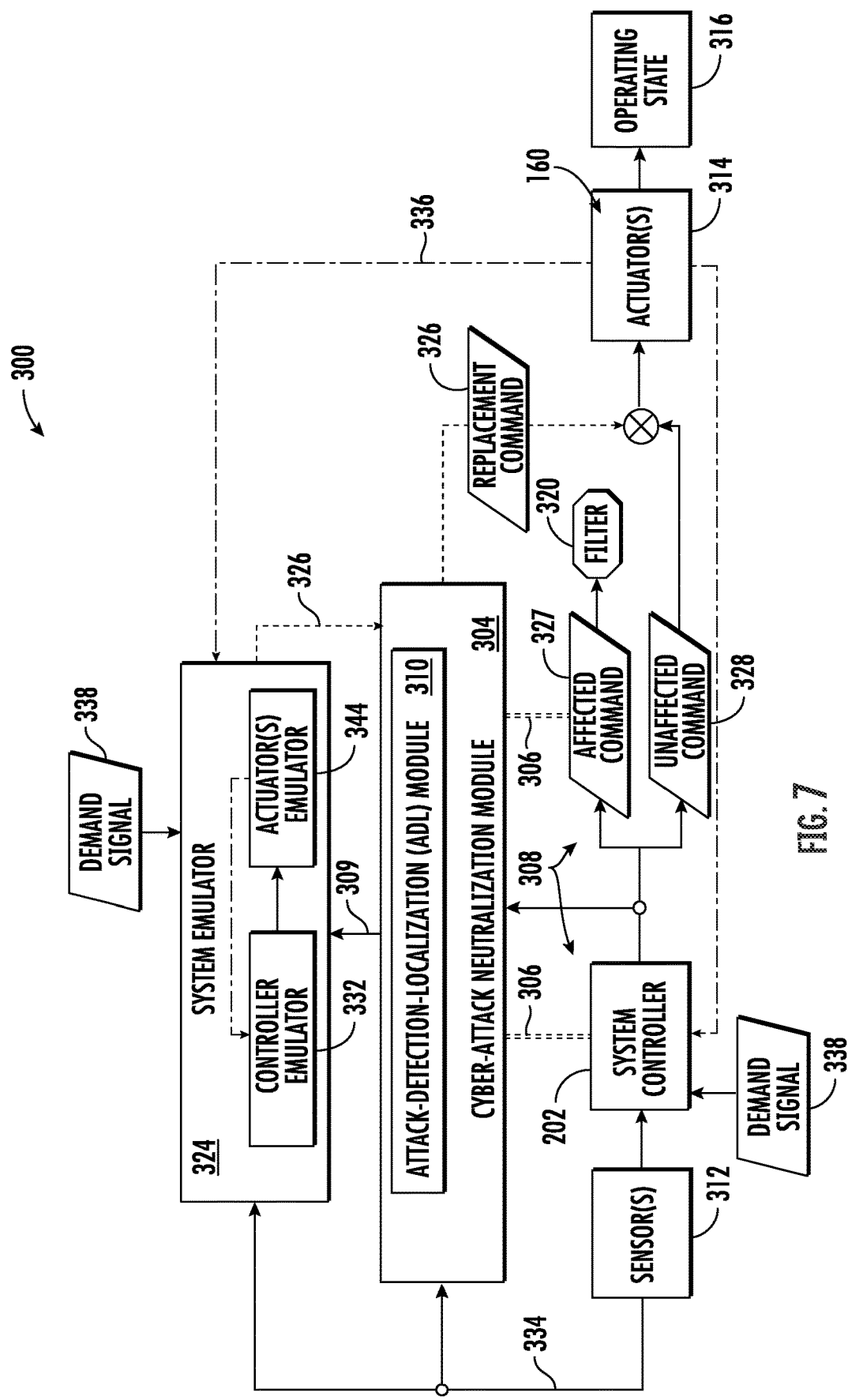
FIG. 7 illustrates a schematic of a portion the system of FIG. 4 for controlling the industrial asset in the presence of a cyber-attack affecting an actuator command signal according to the present disclosure.

Referring now particularly to FIG. 7, in an embodiment, the attack point 308 may correspond to an affected command signal 327 for the first actuator 314. As such, the selected mitigation response(s) may include filtering the affected command signal 327 while permitting unaffected command signals 328 to reach the additional actuator(s) 160. Filtering the affected command signal 327 with the filter 320 may preclude the receipt of the affected command signal 327 by the first actuator 314.

In an embodiment wherein the affected command signal 327 is filtered or otherwise fails to reach the first actuator 314, a replacement command signal 330 may be generated by the system emulator 324. The replacement command signal 330 may be substituted for the affected command signal 327 and the operating state 316 of the industrial asset 100 may be altered. For example, a controller emulator 332 of the system emulator 324 may receive a sensor signal 334 and/or an actuator feedback 336. The controller emulator 332 may also receive a demand signal 338, which may be indicative of a desired output of the industrial asset 100. Based on these inputs, the controller emulator 332 may determine an emulated, nominal-command signal for the first actuator 314 in the absence of the cyber-attack. The replacement command signal 330 may correspond to the emulated, nominal-command signal.

Figure 8:
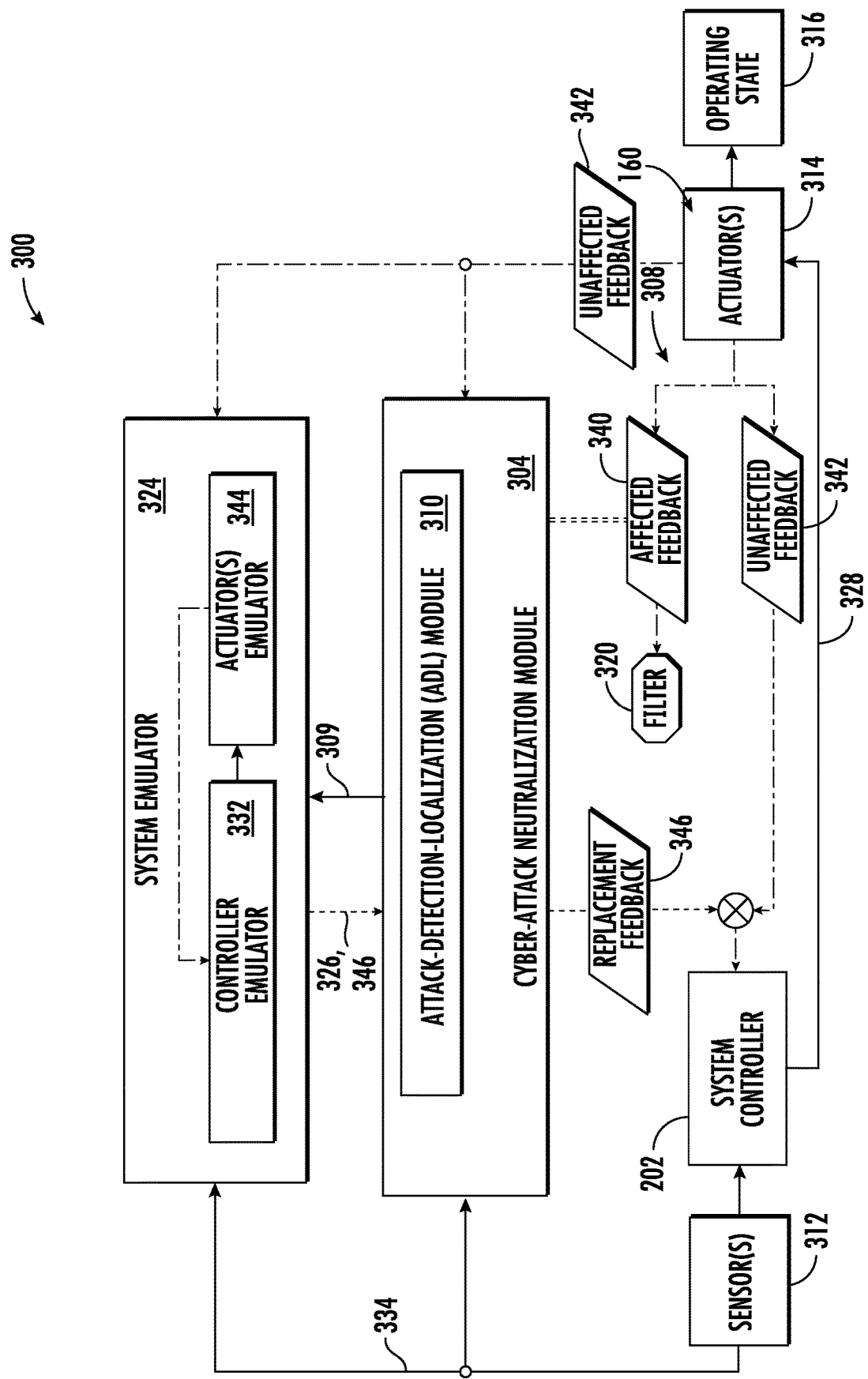
FIG. 8 illustrates a schematic of a portion the system of FIG. 4 for controlling the industrial asset in the presence of a cyber-attack affecting an actuator feedback signal according to the present disclosure.

Referring now particularly to FIG. 8, in an embodiment, the attack point 308 may correspond to an affected feedback signal 340 from the first actuator 314. As such, the selected mitigation response(s) may include filtering the affected feedback signal 340 while permitting unaffected feedback signals 342 from the additional actuator(s) 160 to reach the system controller 202 and/or the system emulator 324. Filtering the affected feedback signal 340 may preclude the receipt of the affected feedback signal 340 by the system controller 202, and may, therefore, preclude the utilization of the affected feedback signal 340 in the determination of an actuator command signal by the system controller 202. It should be appreciated that the affected and unaffected feedback signals 340, 342 may indicate operating points of the actuator(s) 160, such as an orientation, a rotational position, a linear position, an activation status, and/or other similar indication of the operating point of the actuator(s) 160. The operating point of the actuator(s) 160 may be the starting point from which the actuator(s) 160 may translate in response to a command signal from the system controller 202.

In an embodiment wherein the affected feedback signal 340 is filtered or otherwise fails to reach the system controller 202, an actuator emulator 344 may emulate (e.g. model) a replacement feedback signal 346 for the first actuator 314. For example, the actuator emulator 344 may digitally replicate the physical operations of the first actuator 314 in response to command signals from the system controller 202 and/or the controller emulator 332. While the actuator emulator 344 may not operably control a component of the industrial asset 100, the replacement feedback signal 346 generated by actuator emulator 344 may, nevertheless, replicate the nominal feedback signal which would be obtained from the first actuator 314 in the absence of the cyber-attack. In an embodiment, the replacement feedback signal 346 may be combined with the unaffected feedback signal 342 to facilitate the generation of unaffected command signals 328 by the system controller 202 or the controller emulator 332 for the establishment/alteration of the operating state 316 of the industrial asset 100.

Figure 6:
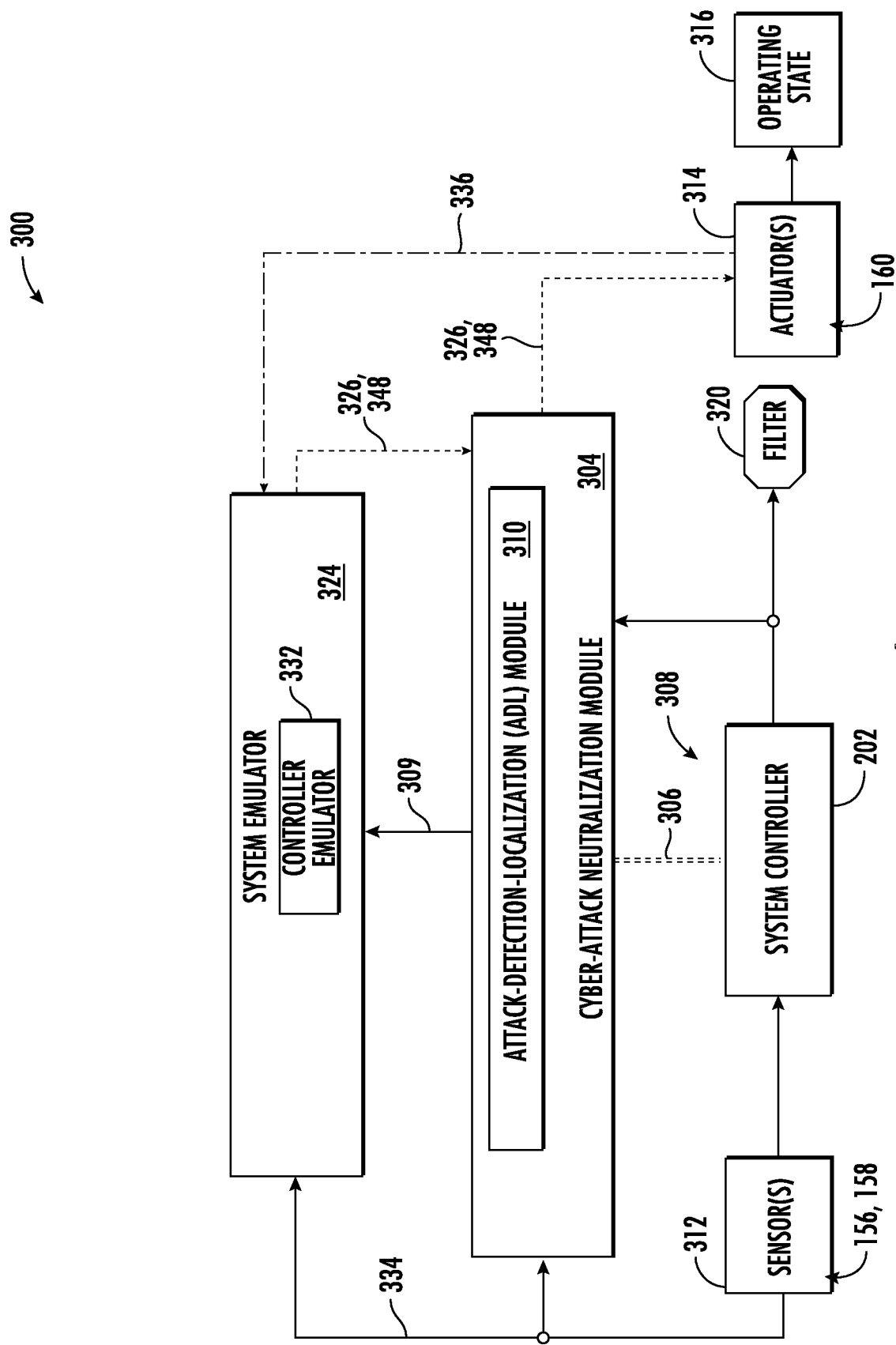
FIG. 6 illustrates a schematic of a portion the system of FIG. 4 for controlling the industrial asset in the presence of a cyber-attack affecting a system controller according to the present disclosure.

Referring now particular to FIG. 6, in an embodiment, the attack point 308 may correspond to the system controller 202. As such, the selected mitigation response(s) may include filtering and output of the system controller 202. Filtering the output of the system controller 202 may preclude the system controller 202 from affecting the operating state 316 of the industrial asset 100. In other words, in an embodiment, the cyber-attack may target the computer-implemented functions (e.g., the methods, steps, calculations and the like and storing relevant data as disclosed herein) of the system controller 202. As a result, the output(s) of the system controller 202 may be altered/corrupted and deviate from the nominal outputs of the system controller 202 under the given operating conditions (e.g., environmental parameters, demand signals, and/or operating parameters) of the industrial asset 100. Accordingly, the filtering of the output of the system controller 202 may isolate the system controller 202 from the control of the industrial asset 100.

In an embodiment wherein the system controller 202 is filtered or otherwise isolated (e.g. shut down, placed in a safe mode, placed in a diagnostic mode, etc.), the controller emulator 332 of the system emulator 324 may be employed as a substitute controller for the industrial asset 100. In such an embodiment, the controller emulator 332 may generate at least one setpoint command 348 configured to establish or maintain an operation of the industrial asset 100 by altering the operating state 316 of the industrial asset 100. For example, in an embodiment, the controller emulator 332 may receive the sensor signal(s) 334 and/or an emulated sensor signal. The controller emulator 332 may then emulate, in the digital environment, the nominal control logic of the system controller 202. The nominal control logic of the system controller 202 may correspond to the control logic implemented by the system controller 202 in the absence of the cyber-attack. By controlling the industrial asset 100 with the controller emulator 332 instead of the affected system controller 202, may facilitate the continued operation and/or orderly shutdown of the industrial asset 100 in order to mitigate the predicted operational impact of the cyber-attack.

Referring now particularly to FIG. 5, in an embodiment, the attack point 308 may correspond to an affected output signal 350 of the first sensor 312. As such, the selected mitigation response(s) may include filtering the affected output signal 350 while permitting at least one unaffected output signals 352 from at least the second sensor 322 to reach the system controller 202. Filtering the affected output signal 350 with the filter 320 may preclude the receipt of the affected output signal 350 by the system controller 202.

In an embodiment wherein the affected output signal 350 is filtered or otherwise fails to reach the system controller 202, the system emulator 324 may be configured to receive the unaffected output signal(s) 352 from at least to the second sensor 322. In an embodiment, the second sensor 322 may be an additional sensor (e.g. an additional environmental and/or operational sensor 156, 158) of the industrial asset 100. In an additional embodiment, the second sensor 322 may be positioned separate from the industrial asset 100. For example, the second sensor 322 may be coupled to an additional industrial asset 100 and/or be a component of an additional sensor system (e.g., the meteorological mast 162).

In an embodiment, the system emulator 324 may utilize a sensor emulator 354 (e.g. a virtual sensor) to emulate a nominal performance of the first sensor 312 based, at least in part, on the unaffected output signal(s) 352. The emulated performance of the first sensor 312 may be utilized by the system emulator 324 to generate at least one replacement output signal 356 for the first sensor 312. In other words, the system emulator 324 may utilize model-based estimation algorithms (e.g. virtual sensing) to produce a calculation of the value for the sensor signal 334 of the first sensor 312 based, at least in part, on the non-attacked sensors 156, 158. The replacement output signal(s) 356 may then be delivered to the system controller 202 and utilized by the system controller 202 to alter the operating state 316 of the industrial asset 100.

Figure 9:
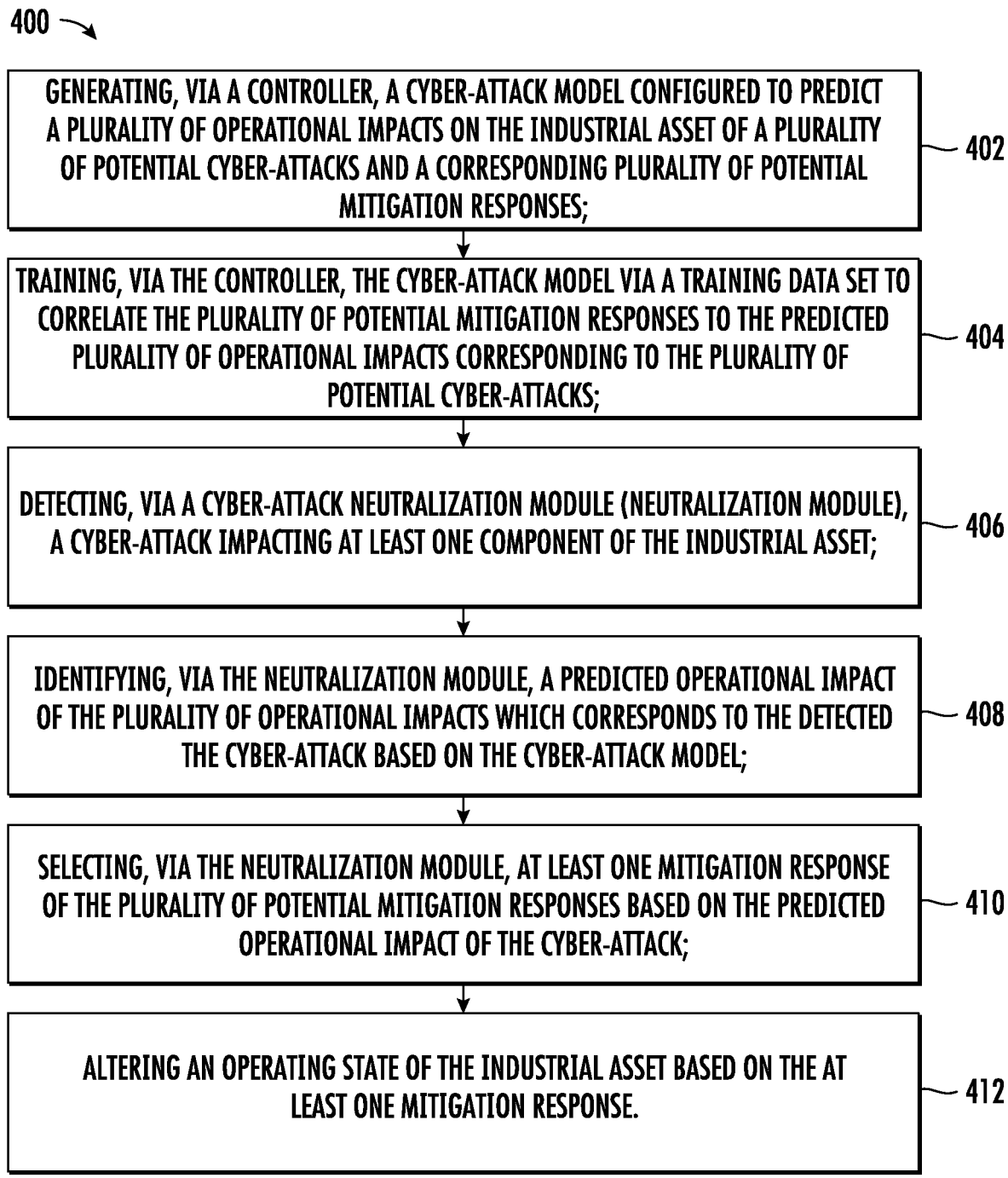
FIG. 9 illustrates a flow chart of an embodiment of a method for controlling the industrial asset according to the present disclosure.

Referring now to FIG. 9 wherein a flow diagram of one embodiment of a method 400 for controlling an industrial asset 100 in the presence of a cyber-attack is illustrated. The method 400 may be implemented using, for instance, the control system 300 discussed above with reference to FIGS. 3-8. FIG. 9 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously or modified in various ways without deviating from the scope of the present disclosure.

As shown at (402), the method 400 may include generating, via a controller, a cyber-attack model configured to predict a plurality of operational impacts on the industrial asset of a plurality of potential cyber-attacks and a corresponding plurality of potential mitigation responses. As shown at (404), the method 400 may include training, via the controller, the cyber-attack model via a training data set to correlate the plurality potential mitigation responses to the predicted plurality of operational impacts corresponding to the plurality of potential cyber-attacks. As shown at (406), the method 400 may include detecting, via a cyber-attack neutralization module (neutralization module), a cyber-attack impacting at least one component of the industrial asset. As shown at (408), the method 400 may include identifying, via the neutralization module, a predicted operational impact of the plurality of operational impacts which corresponds to the detected cyber-attack based on the cyber-attack model. As shown at (410), the method 400 may include selecting, via the neutralization module, at least one mitigation response of the plurality of mitigation responses based on the predicted operational impact of the cyber-attack. Additionally, as shown at (412), the method 400 may include altering an operating state of the industrial asset based on the selected at least one mitigation response.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling an industrial asset, the method comprising: generating, via a controller, a cyber-attack model configured to predict a plurality of operational impacts on the industrial asset of a plurality of potential cyber-attacks and a corresponding plurality of potential mitigation responses; training, via the controller, the cyber-attack model via a training data set to correlate the plurality of potential mitigation responses to the predicted plurality of operational impacts corresponding to the plurality of potential cyber-attacks; detecting, via a cyber-attack neutralization module (neutralization module), a cyber-attack impacting at least one component of the industrial asset; identifying, via the neutralization module, a predicted operational impact of the plurality of operational impacts which corresponds to the detected the cyber-attack based on the cyber-attack model; selecting, via the neutralization module, at least one mitigation response of the plurality of potential mitigation responses based on the predicted operational impact of the cyber-attack; and altering an operating state of the industrial asset based on the at least one mitigation response.

Clause 2. The method of clause 1, wherein detecting the cyber-attack further comprises: identifying an attack point of the cyber-attack via an attack-detection-localization (ADL) module of the neutralization module, the attack point corresponding to at least one of a first sensor, a first actuator, and a system controller of the industrial asset.

Clause 3. The method of any preceding clause, wherein the attack point corresponds to an affected output signal of the first sensor, and wherein selecting the at least one mitigation response further comprises: filtering the affected output signal so as to preclude a utilization of the affected output signal by the system controller to affect the operating state of the industrial asset; and generating, via the system controller, a set point for the industrial asset based, at least in part, on an alternative signal obtained from a second sensor.

Clause 4. The method of any preceding clause, wherein determining the predicted operational impact further comprises: determining, via the ADL module, a severity score for the cyber-attack; and wherein selecting the at least one mitigation response further comprises selecting the at least one mitigation response based, at least in part, on the severity score.

Clause 5. The method of any preceding clause, wherein the at least one mitigation response comprises: emulating, via a system emulator, a nominal operating state of the industrial asset in response to an operating condition affecting the industrial asset; generating at least one output of the system emulator corresponding to an input or output of at least one of the first sensor, the first actuator, and the system controller of the industrial asset in the absence of a cyber-attack; and replacing, with the at least one output of the emulator, at least one input or output of the at least one of the first sensor, the first actuator, and the system controller which is subject to the cyber-attack, wherein replacing the at least one input or output with the at least one output of the emulator mitigates the predicted operational impact of the cyber-attack.

Clause 6. The method of any preceding clause, wherein the attack point corresponds to an affected command signal for the first actuator, and wherein replacing the at least one input or output subject to the cyber-attack further comprises: filtering the affected command signal; and generating a replacement command signal for the first actuator via the system emulator.

Clause 7. The method of any preceding clause, wherein the attack point corresponds to an affected feedback signal of the first actuator, and wherein replacing the at least one input or output subject to the cyber-attack further comprises: filtering the affected feedback signal; modeling a replacement feedback signal for the first actuator via an actuator emulator of the system emulator; delivering the replacement feedback signal to the system controller; and generating a command signal for the first actuator based, at least in part, on the replacement feedback signal.

Clause 8. The method of any preceding clause, wherein the attack point corresponds to the system controller, and wherein replacing the at least one input or output subject to the cyber-attack further comprises: filtering an output of the system controller so as to preclude the system controller from affecting the operating state of the industrial asset; and generating, via a controller emulator of the system emulator, at least one setpoint command configured to establish or maintain an operation of the industrial asset by altering the operating state of the industrial asset.

Clause 9. The method of any preceding clause, wherein the attack point corresponds to an affected output signal of the first sensor, and wherein replacing the at least one input or output subject to the cyber-attack further comprises: filtering the affected output signal of the first sensor; receiving, via the system emulator, an unaffected output signal from at least a second sensor; generating a replacement output signal for the first sensor via a sensor emulator of the system emulator based, at least in part, on the unaffected output signal; and delivering the replacement output signal to the system controller.

Clause 10. The method of any preceding clause, wherein the second sensor is positioned separate from the industrial asset.

Clause 11. The method of claim 5, further comprising: correlating, via the neutralization module, the predicted operational impact to an impact on an output of the industrial asset delivered to a connected system; and utilizing the least one output of the system emulator to mitigate the impact of the cyber-attack on the output of the industrial asset.

Clause 12. The method of any preceding clause, wherein mitigating the impact of the cyber-attack on the output of the industrial asset further comprises derating the industrial asset.

Clause 13. The method of any preceding clause, wherein determining the predicted operational impact of the cyber-attack further comprises: correlating, via the neutralization module, the predicted operational impact to an accumulation of damage to a component of the industrial asset; and derating the industrial asset to mitigate the accumulation of damage.

Clause 14. The method of any preceding clause, wherein determining the predicted operational impact of the cyber-attack further comprises: correlating, via the neutralization module, the predicted operational impact to an unwarranted shutdown of the industrial asset in response to a shutdown protocol of a safety system in response to the detected cyber-attack, wherein the shutdown protocol is unwarranted for the operating state of the industrial asset; and overriding, via the neutralization module, the shutdown protocol to preclude the unwarranted shutdown of the industrial asset.

Clause 15. The method of any preceding clause, wherein the industrial asset comprises a wind turbine.

Clause 16. A system for controlling and industrial asset, the system comprising: at least one sensor operably coupled to the industrial asset; at least one actuator operably coupled to the industrial asset; a system controller communicatively coupled to the at least one sensor and the at least one actuator, the system controller comprising at least one processor configured to perform a first plurality of operations so as to affect an operating state of the industrial asset; and a neutralization module operably coupled to the at least one sensor, the at least one actuator, and the system controller, the neutralization module comprising at least one processor configured to perform a second plurality of operations, the second plurality of operations comprising: detecting, via a cyber-attack neutralization module (neutralization module), a cyber-attack impacting at least one component of the industrial asset, identifying a predicted operational impact of a plurality of operational impacts which corresponds to the detected the cyber-attack based on a cyber-attack model, wherein the plurality of operational impacts are generated via a controller implementing a cyber-attack model to predict the plurality of operational impacts on the industrial asset of a plurality of potential cyber-attacks, selecting at least one mitigation response of a plurality of potential mitigation responses based on the predicted operational impact of the cyber-attack, wherein the plurality of potential mitigation responses are generated via the cyber-attack model, and wherein an operating state of the industrial asset is altered based on the at least one mitigation response.

Clause 17. The system of any preceding clause, wherein detecting the cyber-attack further comprises: identifying an attack point of the cyber-attack via an attack-detection-localization (ADL) module of the neutralization module, the attack point corresponding to at least one of a first sensor, a first actuator, and a system controller of the industrial asset.

Clause 18. The system of any preceding clause, wherein the at least one mitigation response further comprises: emulating, via a system emulator, a nominal operating state of the industrial asset in response to an operating condition affecting the industrial asset, and generating at least one output of the system emulator corresponding to an input or output of at least one of the first sensor, the first actuator, and the system controller of the industrial asset in the absence of a cyber-attack.

Clause 19. The system of any preceding clause, wherein the attack point corresponds to the system controller, and wherein replacing the input and/or output subject to the cyber-attack further comprises: filtering an output of the system controller so as to preclude the system controller from affecting the operating state of the industrial asset; and generating, via a controller emulator of the system emulator, at least one setpoint command configured to establish or maintain an operation of the industrial asset by altering the operating state of the industrial asset.

Clause 20. The system of any preceding clause, wherein the industrial asset comprises a wind turbine.

What is claimed is:

1. A method for controlling an industrial asset, the method comprising:
   generating, via a controller, a cyber attack model configured to predict a plurality of operational impacts on the industrial asset of a plurality of potential cyber attacks and a corresponding plurality of potential mitigation responses;
   training, via the controller, the cyber attack model via a training data set to correlate the plurality of potential mitigation responses to the predicted plurality of operational impacts corresponding to the plurality of potential cyber attacks;
   detecting, via a cyber attack neutralization module (neutralization module), a cyber attack impacting at least one component of the industrial asset;
   identifying, via the neutralization module, a predicted operational impact of the plurality of operational impacts which corresponds to the detected the cyber attack based on the cyber attack model;
   selecting, via the neutralization module, at least one mitigation response of the plurality of potential mitigation responses based on the predicted operational impact of the cyber attack; and
   altering an operating state of the industrial asset based on the at least one mitigation response,
   wherein identifying the predicted operational impact of the cyber attack further comprises:
      correlating, via the neutralization module, the predicted operational impact to an unwarranted shutdown of the industrial asset in response to a shutdown protocol of a safety system in response to the detected cyber attack, wherein the shutdown protocol is unwarranted for the operating state of the industrial asset and
   overriding, via the neutralization module, the shutdown protocol to preclude the unwarranted shutdown of the industrial asset.

2. The method of claim 1, wherein detecting the cyber attack further comprises:
   identifying an attack point of the cyber attack via an attack detection localization (ADL) module of the neutralization module, the attack point corresponding to at least one of a first sensor, a the first actuator, and a system controller of the industrial asset.

3. The method of claim 2, wherein the attack point corresponds to an affected output signal of the first sensor, and wherein selecting the at least one mitigation response further comprises:
   filtering the affected output signal so as to preclude a utilization of the affected output signal by the system controller to affect the operating state of the industrial asset; and
   generating, via the system controller, a set point for the industrial asset based, at least in part, on an alternative signal obtained from a second sensor.

4. The method of claim 2, wherein determining the predicted operational impact further comprises:
   determining, via the ADL module, a severity score for the cyber attack; and
   wherein selecting the at least one mitigation response further comprises selecting the at least one mitigation response based, at least in part, on the severity score.

5. The method of claim 2, wherein the at least one mitigation response comprises:
   emulating, via a system emulator, a nominal operating state of the industrial asset in response to an operating condition affecting the industrial asset;
   generating at least one output of the system emulator corresponding to an input or output of at least one of the first sensor, the first actuator, and the system controller of the industrial asset in the absence of a cyber attack; and
   replacing, with the at least one output of the emulator, at least one input or output of the at least one of the first sensor, the first actuator, and the system controller which is subject to the cyber attack, wherein replacing the at least one input or output with the at least one output of the emulator mitigates the predicted operational impact of the cyber attack.

6. The method of claim 5, wherein the attack point corresponds to an affected command signal for the first actuator, and wherein replacing the at least one input or output subject to the cyber attack further comprises:
filtering the affected command signal; and
generating a replacement command signal for the first actuator via the system emulator.

7. The method of claim 5, wherein the attack point corresponds to an affected feedback signal of the first actuator, and wherein replacing the at least one input or output subject to the cyber attack further comprises:
filtering the affected feedback signal;
modeling a replacement feedback signal for the first actuator via an actuator emulator of the system emulator;
delivering the replacement feedback signal to the system controller; and
generating a command signal for the first actuator based, at least in part, on the replacement feedback signal.

8. The method of claim 5, wherein the attack point corresponds to the system controller, and wherein replacing the at least one input or output subject to the cyber attack further comprises:
filtering an output of the system controller so as to preclude the system controller from affecting the operating state of the industrial asset; and
generating, via a controller emulator of the system emulator, at least one setpoint command configured to establish or maintain an operation of the industrial asset by altering the operating state of the industrial asset.

9. The method of claim 5, wherein the attack point corresponds to an affected output signal of the first sensor, and wherein replacing the at least one input or output subject to the cyber attack further comprises:
filtering the affected output signal of the first sensor;
receiving, via the system emulator, an unaffected output signal from at least a second sensor;
generating a replacement output signal for the first sensor via a sensor emulator of the system emulator based, at least in part, on the unaffected output signal; and
delivering the replacement output signal to the system controller.

10. The method of claim 9, wherein the second sensor is positioned separate from the industrial asset.

11. The method of claim 5, further comprising:
correlating, via the neutralization module, the predicted operational impact to an impact on an output of the industrial asset delivered to a connected system; and
utilizing the least one output of the system emulator to mitigate the impact of the cyber attack on the output of the industrial asset.

12. The method of claim 11, wherein mitigating the impact of the cyber attack on the output of the industrial asset further comprises derating the industrial asset.

13. The method of claim 1, wherein determining the predicted operational impact of the cyber attack further comprises:
correlating, via the neutralization module, the predicted operational impact to an accumulation of damage to a component of the industrial asset; and
derating the industrial asset to mitigate the accumulation of damage.

14. A system for controlling and industrial asset, the system comprising:

at least one sensor operably coupled to the industrial asset;
at least one actuator operably coupled to the industrial asset;
a system controller communicatively coupled to the at least one sensor and the at least one actuator, the system controller comprising at least one processor configured to perform a first plurality of operations so as to affect an operating state of the industrial asset; and
a neutralization module operably coupled to the at least one sensor, the at least one actuator, and the system controller, the neutralization module comprising at least one processor configured to perform a second plurality of operations, the second plurality of operations comprising:
detecting, via a cyber attack neutralization module (neutralization module), a cyber attack impacting at least one component of the industrial asset,
identifying a predicted operational impact of a plurality of operational impacts which corresponds to the detected the cyber attack based on a cyber attack model, wherein the plurality of operational impacts are generated via a controller implementing a cyber attack model to predict the plurality of operational impacts on the industrial asset of a plurality of potential cyber attacks,
selecting at least one mitigation response of a plurality of potential mitigation responses based on the predicted operational impact of the cyber attack, wherein the plurality of potential mitigation responses are generated via the cyber attack model, and wherein an operating state of the industrial asset is altered based on the at least one mitigation response,
wherein identifying the predicted operational impact of the cyber attack further comprises:
correlating, via the neutralization module, the predicted operational impact to an unwarranted shutdown of the industrial asset in response to a shutdown protocol of a safety system in response to the detected cyber attack, wherein the shutdown protocol is unwarranted for the operating state of the industrial asset and
overriding, via the neutralization module, the shutdown protocol to preclude the unwarranted shutdown of the industrial asset.

15. The system of claim 14, wherein detecting the cyber attack further comprises:
identifying an attack point of the cyber attack via an attack detection localization (ADL) module of the neutralization module, the attack point corresponding to at least one of a first sensor, a first actuator, and a system controller of the industrial asset.

16. The system of claim 15, wherein the at least one mitigation response further comprises:
emulating, via a system emulator, a nominal operating state of the industrial asset in response to an operating condition affecting the industrial asset, and
generating at least one output of the system emulator corresponding to an input or output of at least one of the first sensor, the first actuator, and the system controller of the industrial asset in the absence of a cyber attack.

17. The system of claim 16, wherein the attack point corresponds to the system controller, and wherein replacing at least one of the input or output subject to the cyber attack further comprises:

filtering an output of the system controller so as to preclude the system controller from affecting the operating state of the industrial asset; and generating, via a controller emulator of the system emulator, at least one setpoint command configured to establish or maintain an operation of the industrial asset by altering the operating state of the industrial asset.

18. The system of claim 14, wherein the industrial asset comprises a wind turbine.

19. A method for controlling an industrial asset, the method comprising:

generating, via a controller, a cyber attack model configured to predict a plurality of operational impacts on the industrial asset of a plurality of potential cyber attacks and a corresponding plurality of potential mitigation responses;

training, via the controller, the cyber attack model via a training data set to correlate the plurality of potential mitigation responses to the predicted plurality of operational impacts corresponding to the plurality of potential cyber attacks;

detecting, via a cyber attack neutralization module (neutralization module), a cyber attack impacting at least one component of the industrial asset;

identifying, via the neutralization module, a predicted operational impact of the plurality of operational impacts which corresponds to the detected the cyber attack based on the cyber attack model;

selecting, via the neutralization module, at least one mitigation response of the plurality of potential mitigation responses based on the predicted operational impact of the cyber attack; and altering an operating state of the industrial asset based on the at least one mitigation response, wherein altering the operating state of the industrial asset comprises affecting, via a first actuator operably coupled to the industrial asset, at least one of a physical configuration, an orientation, and an operating status of the industrial asset, and wherein identifying the predicted operational impact of the cyber attack further comprises:

correlating, via the neutralization module, the predicted operational impact to an unwarranted shutdown of the industrial asset in response to a shutdown protocol of a safety system in response to the detected cyber attack, wherein the shutdown protocol is unwarranted for the operating state of the industrial asset; and overriding, via the neutralization module, the shutdown protocol to preclude the unwarranted shutdown of the industrial asset.

* * * * *